United States Patent
Myung et al.

(10) Patent No.: US 11,445,485 B2
(45) Date of Patent: Sep. 13, 2022

(54) METHOD FOR TRANSMITTING UPLINK CONTROL INFORMATION OF TERMINAL IN WIRELESS COMMUNICATION SYSTEM AND TERMINAL USING METHOD

(71) Applicant: LG Electronics Inc., Seoul (KR)

(72) Inventors: Sechang Myung, Seoul (KR); Joonkui Ahn, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 16/646,046

(22) PCT Filed: Sep. 10, 2018

(86) PCT No.: PCT/KR2018/010538
§ 371 (c)(1),
(2) Date: Mar. 10, 2020

(87) PCT Pub. No.: WO2019/050355
PCT Pub. Date: Mar. 14, 2019

(65) Prior Publication Data
US 2020/0280980 A1    Sep. 3, 2020

Related U.S. Application Data

(60) Provisional application No. 62/556,501, filed on Sep. 10, 2017.

(51) Int. Cl.
*H04W 72/04*    (2009.01)
*H04L 1/18*    (2006.01)

(52) U.S. Cl.
CPC ....... *H04W 72/0413* (2013.01); *H04L 1/1812* (2013.01)

(58) Field of Classification Search
CPC combination set(s) only.
See application file for complete search history.

(56) References Cited

U.S. PATENT DOCUMENTS

| 8,750,143 B2 * | 6/2014 | Yin | H04W 72/02 370/252 |
|---|---|---|---|
| 10,333,679 B2 * | 6/2019 | Ahn | H04L 1/0031 |

(Continued)

FOREIGN PATENT DOCUMENTS

| KR | 101690396 | 12/2016 |
|---|---|---|
| KR | 101749199 | 7/2017 |
| WO | WO2017/052251 | 3/2017 |

OTHER PUBLICATIONS

LG Electronics, "Remaining details on sPUCCH design", R1-1713072, 3GPP TSG RAN WG1 Meeting #90, Prague, Czech Republic, Aug. 21-25, 2017, 6 pages.

(Continued)

*Primary Examiner* — Hanh N Nguyen
(74) *Attorney, Agent, or Firm* — Fish & Richardson P.C.

(57) ABSTRACT

A method for transmitting uplink control information of a terminal in a wireless communication system and a terminal using the method are provided. The method generates uplink control information, transmits the uplink control information to a base station using a specific PUCCH format among a plurality of physical uplink control channel (PUCCH) formats, wherein the specific PUCCH format which is used is determined on the basis of the number of symbols in the time domain used for transmission of uplink control information and the number of bits of the uplink control information.

8 Claims, 15 Drawing Sheets

(56) References Cited

U.S. PATENT DOCUMENTS

| | | | |
|---|---|---|---|
| 10,356,761 B2* | 7/2019 | Yerramalli | H04L 5/0053 |
| 2017/0366377 A1* | 12/2017 | Papasakellariou | H04L 1/0026 |
| 2018/0145796 A1* | 5/2018 | Liang | H04L 1/1896 |
| 2019/0215824 A1* | 7/2019 | Takeda | H04L 5/0007 |

OTHER PUBLICATIONS

ZTE, "sPUCCH format design", R1-1712326, 3GPP TSG RAN WG1 Meeting #90, Prague, Czech Republic, Aug. 21-25, 2017, 9 pages.

LG Electronics, "Overall structure of NR-PUCCH formats", R1-1700502, 3GPP TSG RAN WG1 NR—AdHoc Meeting, Spokane, USA, Jan. 16-20, 2017, 7 pages.

* cited by examiner

METHOD FOR TRANSMITTING UPLINK CONTROL INFORMATION OF TERMINAL IN WIRELESS COMMUNICATION SYSTEM AND TERMINAL USING METHOD

CROSS-REFERENCE TO RELATED APPLICATIONS

This application is a National Stage application under 35 U.S.C. § 371 of International Application No. PCT/KR2018/010538, filed on Sep. 10, 2018, which claims the benefit of U.S. Provisional Application No. 62/556,501, filed on Sep. 10, 2017. The disclosures of the prior applications are incorporated by reference in their entirety.

BACKGROUND OF THE DISCLOSURE

Field of the Disclosure

The present disclosure relates to wireless communication and, more particularly, to a method for transmitting uplink control information by a user equipment in a wireless communication system and a device using the method.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

In NR, a method for supporting orthogonal frequency division multiplexing (OFDM) allowing different numerologies according to various services is being considered. In other words, NR systems may consider to support an OFDM scheme (or multiple access scheme) allowing independent numerologies for the respective time and frequency resource regions.

Also, flexibility for supporting various services is considered to be an important design factor in NR systems. For example, when scheduling is performed in units of slots, NR systems may support a structure which allows an arbitrary slot to be changed dynamically to a physical downlink shared channel (PDSCH) (namely a physical channel transmitting downlink data) transmission slot (hereinafter, a DL slot) or a physical uplink shared channel (PUSCH) (namely a physical channel transmitting uplink data). This feature may be said to as support dynamic DL/UL configurations.

As described above, the NR system provides much greater flexibility than the legacy long term evolution (LTE) system. As a result, the payload size of control information transmitted by a user equipment to the uplink and resources required for the uplink transmission may vary considerably. Therefore, it is not desirable to apply the uplink control channel format used in the LTE system in the same way to the NR, but it is necessary to define a specific format for the uplink control channel in the NR by taking into account the feature described above.

SUMMARY OF THE DISCLOSURE

A technical object of the present disclosure is to provide a method for transmitting uplink control information of a user equipment in a wireless communication system and a device using the method.

In one aspect, provided is a method for transmitting uplink control information by a User Equipment (UE) in a wireless communication system. The method includes generating the uplink control information and transmitting the uplink control information to a gNB by using a specific physical uplink control channel (PUCCH) format among a plurality of PUCCH formats. The specific PUCCH format used is determined based on the number of symbols of the time domain used for transmission of the uplink control information and the number of bits of the uplink control information, and the plurality of PUCCH formats include PUCCH format 0 used when the number of symbols of the time domain used for transmission of the uplink control information is 1 or 2, and the number of bits of the uplink control information is 1 or 2, PUCCH format 1 used when the number of symbols of the time domain used for transmission of the uplink control information is 4 or more, and the number of bits of the uplink control information is 1 or 2, PUCCH format 2 used when the number of symbols of the time domain used for transmission of the uplink control information is 1 or 2, and the number of bits of the uplink control information is larger than 2 and PUCCH format 3 or 4 used when the number of symbols of the time domain used for transmission of the uplink control information is 4 or more, and the number of bits of the uplink control information is larger than 2.

The specific PUCCH format may be transmitted by using a PUCCH resource indicated through downlink control information (DCI) among a plurality of PUCCH resources.

The plurality of PUCCH resources may be configured through a radio resource control (RRC) signal.

Each of the plurality of PUCCH resources may include at least one of a parameter related to a first symbol to which a PUCCH is transmitted, a parameter related to a first physical resource block (PRB) to which a PUCCH is transmitted, a parameter related to the number of symbols to which a PUCCH is transmitted, a parameter related to an orthogonal cover code (OCC), and a parameter related to cyclic shift (CS).

The method may further comprise receiving data from the gNB.

The uplink control information may include acknowledge/negative-acknowledgement (ACK/NACK) for the data.

The specific PUCCH format may be transmitted within a slot including 14 symbols in the time domain.

The PUCCH format 3 may not support multiplexing with PUCCH formats transmitted by other UEs.

The PUCCH format 4 may support multiplexing with PUCCH formats transmitted by other UEs.

In another aspect, provided is a user equipment (UE). The UE includes a transceiver transmitting and receiving radio signals and a processor operating in conjunction with the transceiver. The processor is configured to generate the uplink control information and transmit the uplink control information to a gNB by using a specific physical uplink control channel (PUCCH) format among a plurality of PUCCH formats. The specific PUCCH format used is determined based on the number of symbols of the time domain used for transmission of the uplink control information and the number of bits of the uplink control information, and the plurality of PUCCH formats include PUCCH format 0 used when the number of symbols of the time domain used for transmission of the uplink control information is 1 or 2, and the number of bits of the uplink control information is 1 or 2, PUCCH format 1 used when the number of symbols of the time domain used for transmission of the uplink control information is 4 or more, and the number of bits of the uplink control information is 1 or 2, PUCCH format 2 used when the number of symbols of the time domain used for transmission of the uplink control information is 1 or 2, and the number of bits of the uplink control information is larger than 2, and PUCCH format 3 or 4 used when the number of symbols of the time domain used for transmission of the uplink control information is 4 or more, and the number of bits of the uplink control information is larger than 2.

The present disclosure uses a suitable, specific format among a plurality of uplink control channel formats according to the payload size of control information transmitted to the uplink by a user equipment and resources required for the uplink transmission. Therefore, the present disclosure may reduce waste of resources. Also, the present disclosure provides specific examples of the plurality of uplink control channels formats, thereby facilitating NR implementation.

DESCRIPTION OF EXEMPLARY
EMBODIMENTS

Figure 1:
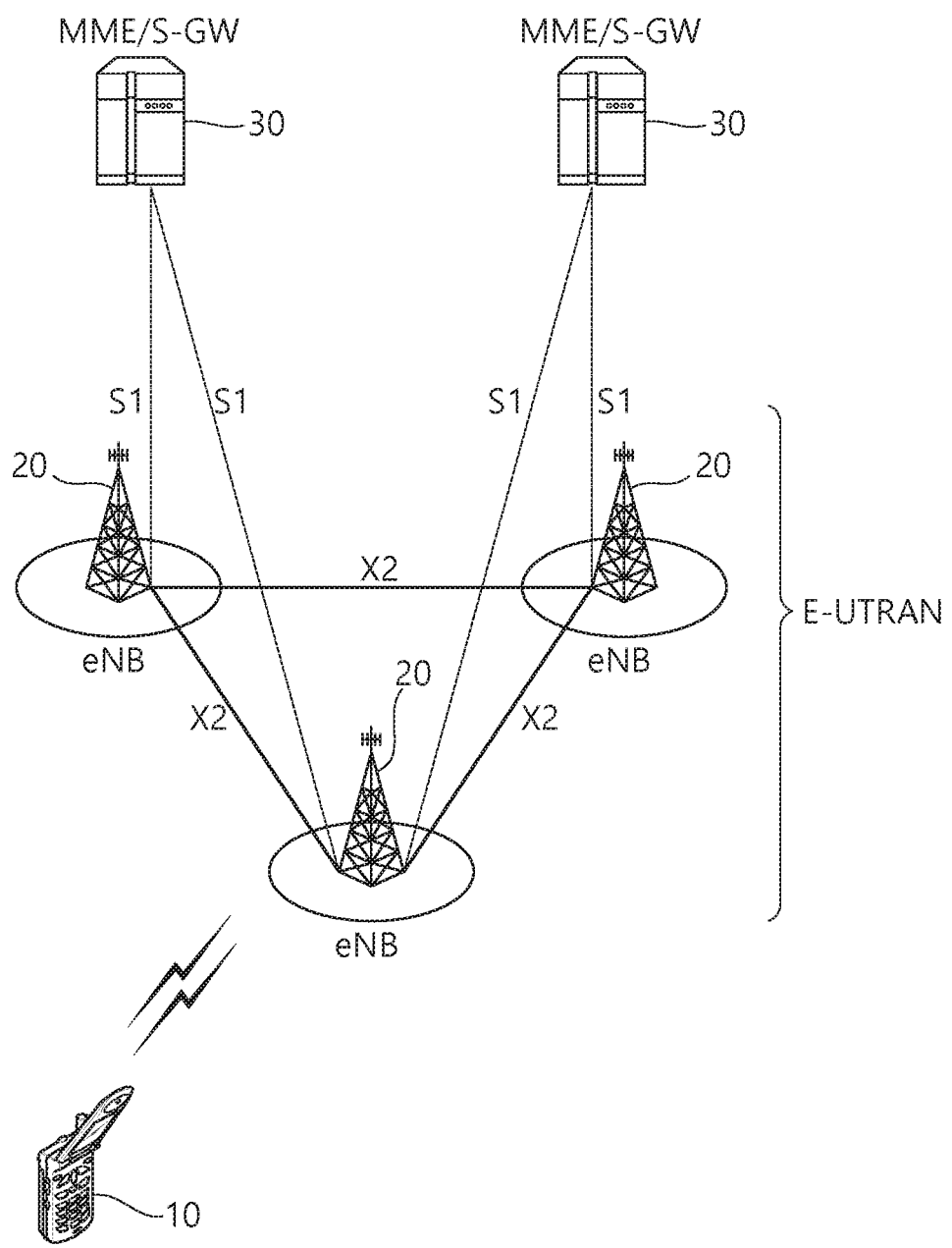
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
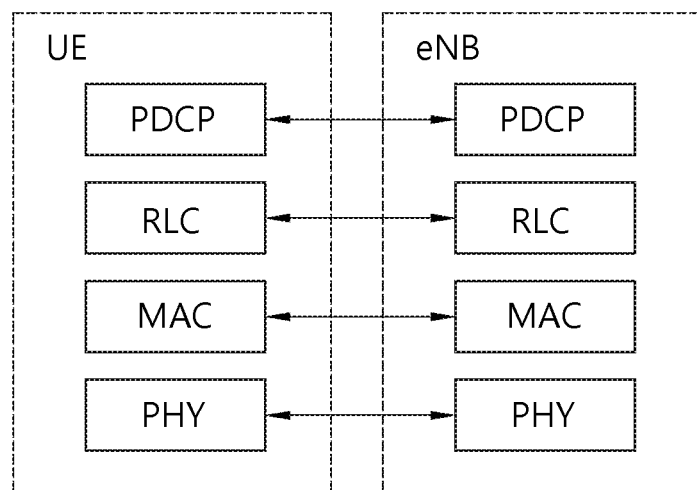
FIG. 2 is a diagram showing a radio protocol architecture for a user plane.
Figure 3:
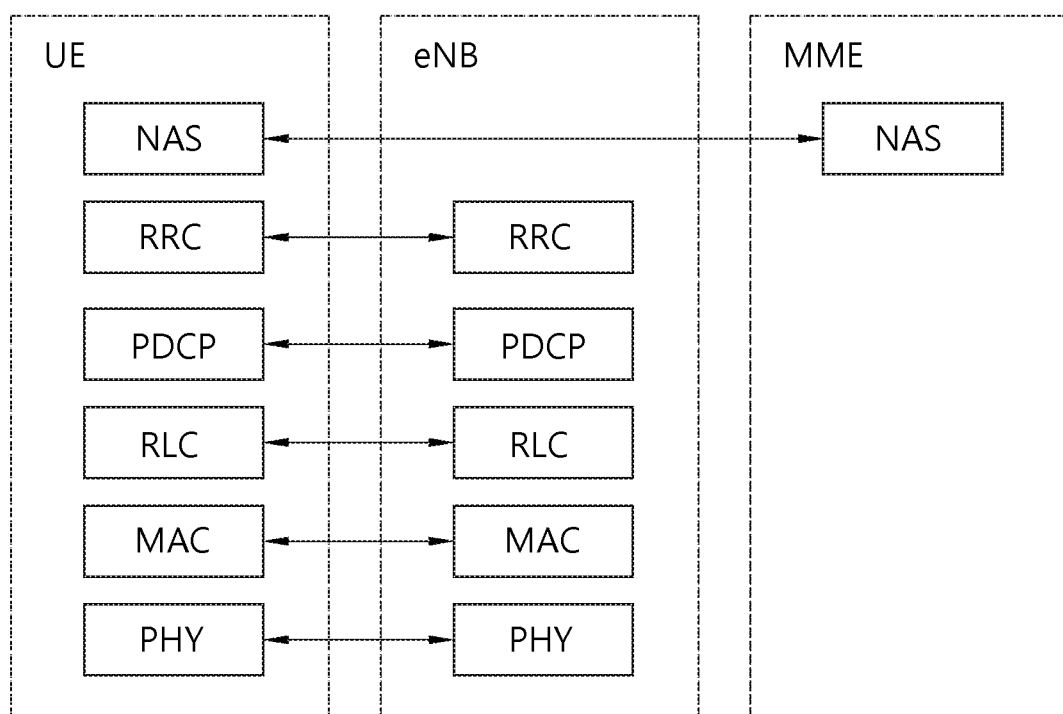
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
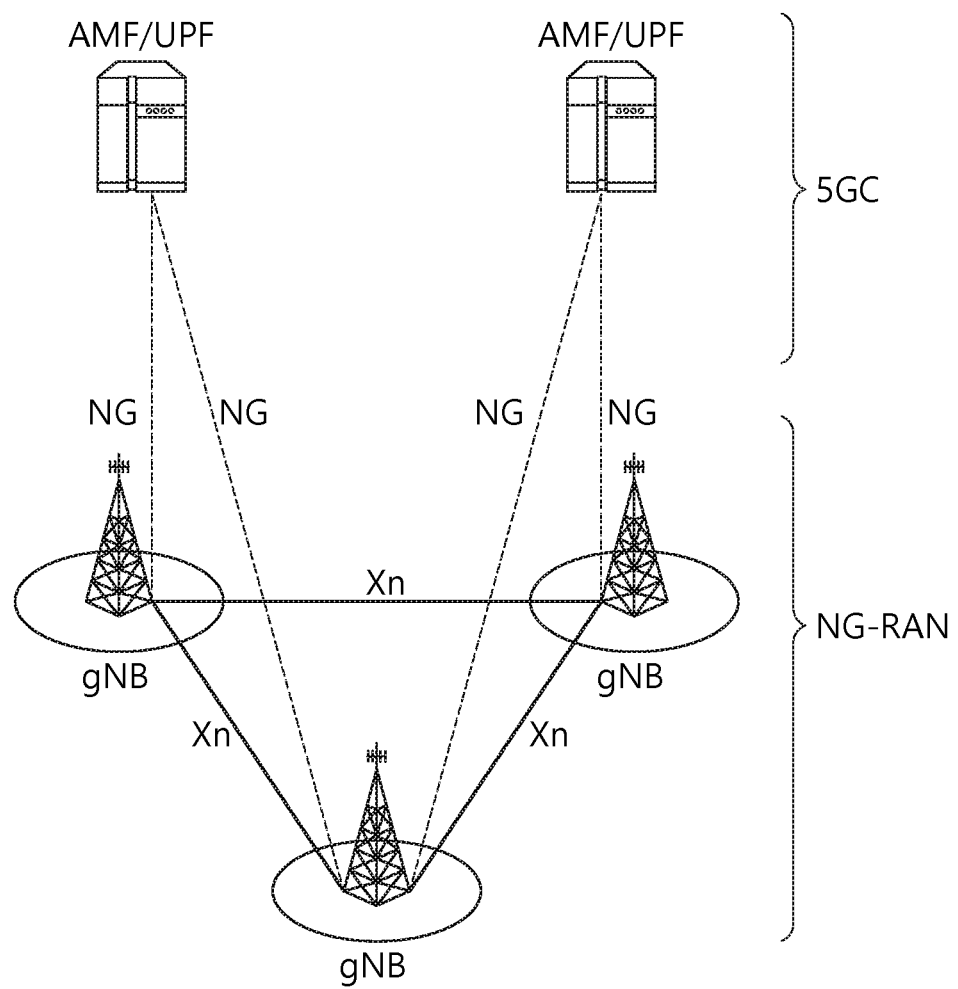
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
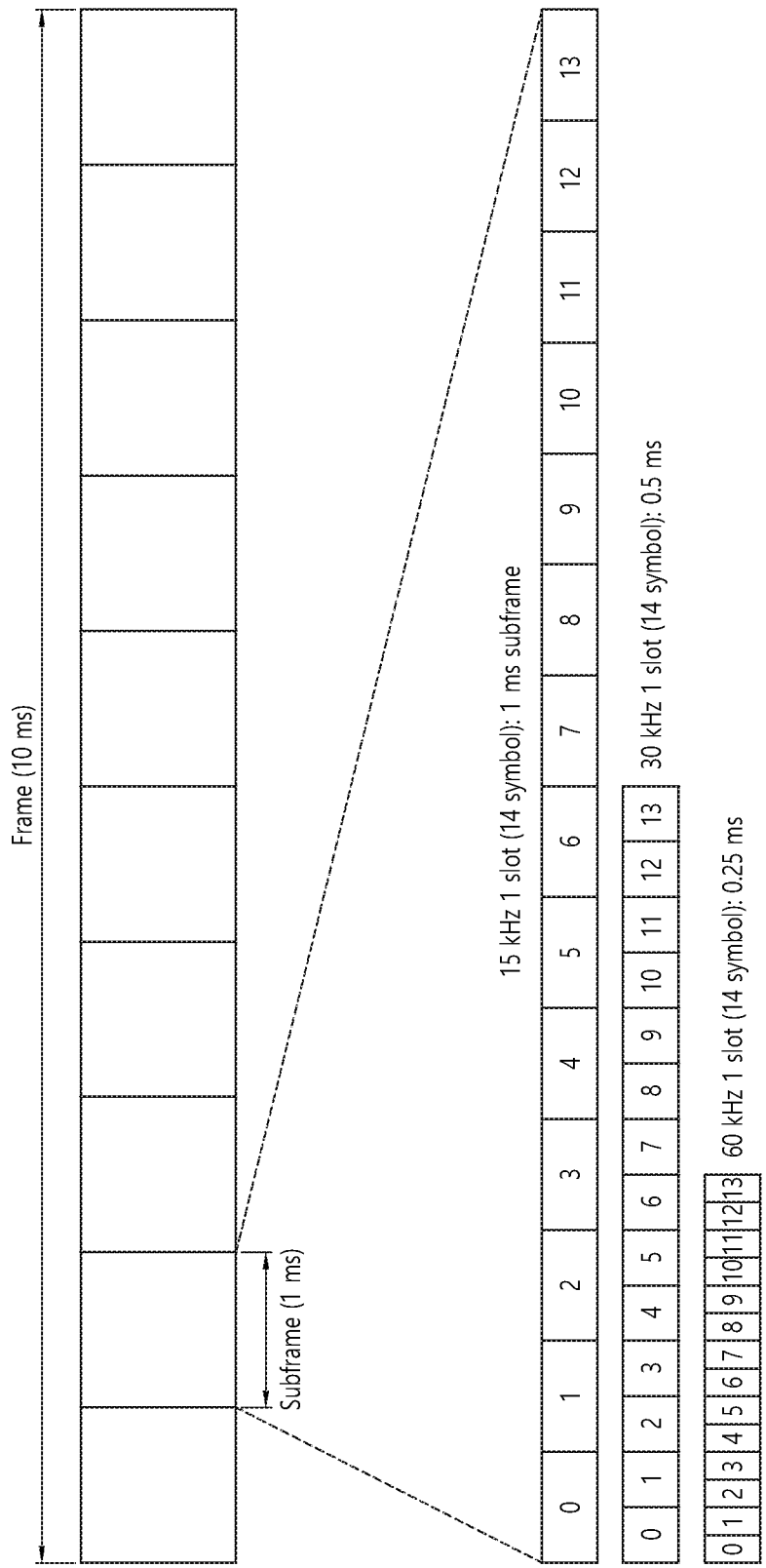
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table illustrates a subcarrier spacing configuration $\mu$.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Extended |
| 4 | 240 | normal |

The following table illustrates the number of slots in a frame ($N^{frame,\mu}_{slot}$), the number of slots in a subframe $N^{subframe,\mu}_{slot}$, the number of symbols in a slot ($N^{slot}_{symb}$), and the like, according to subcarrier spacing configurations $\mu$.

TABLE 2

| $\mu$ | $N^{symb}_{slot}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, $\mu$=0, 1, 2 is illustrated.

A physical downlink control channel (PDCCH) may include one or more control channel elements (CCEs) as illustrated in the following table.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
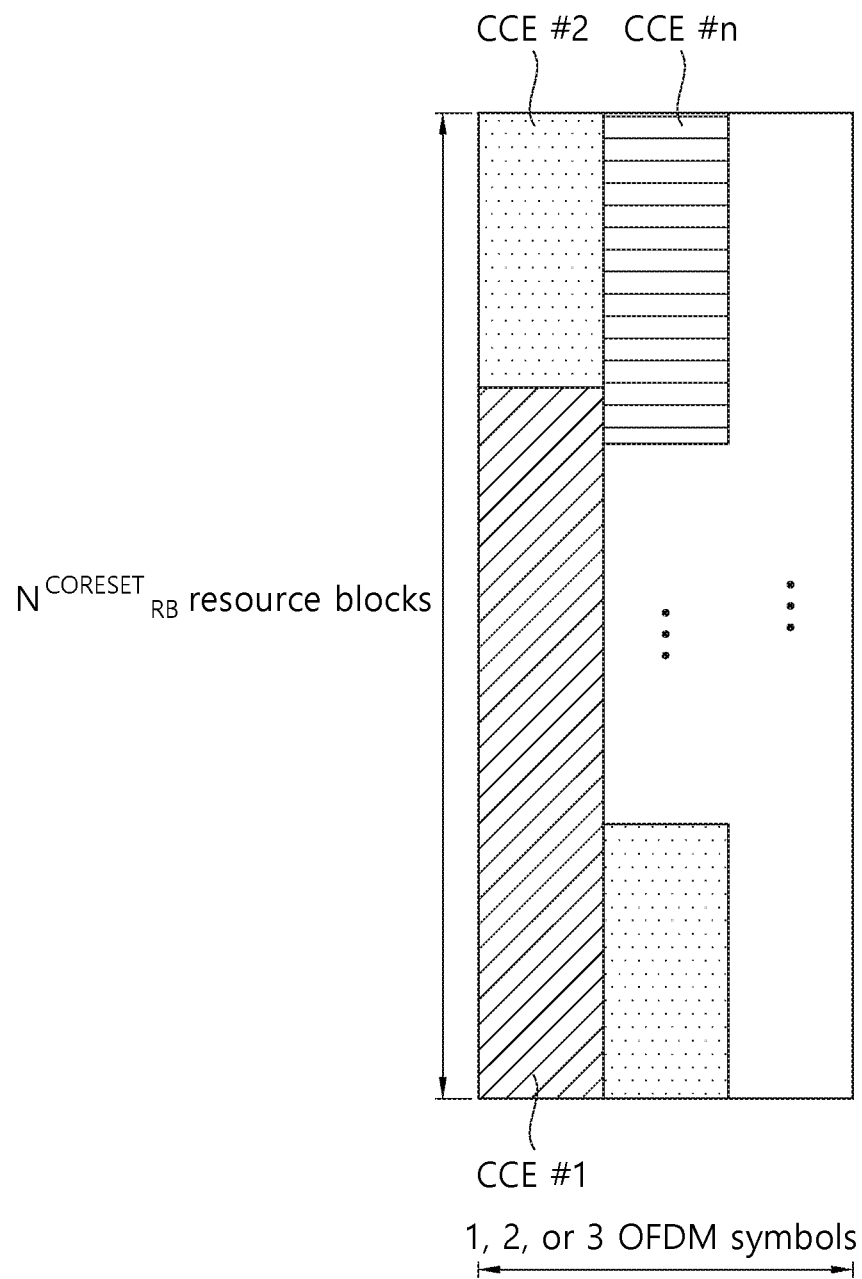
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
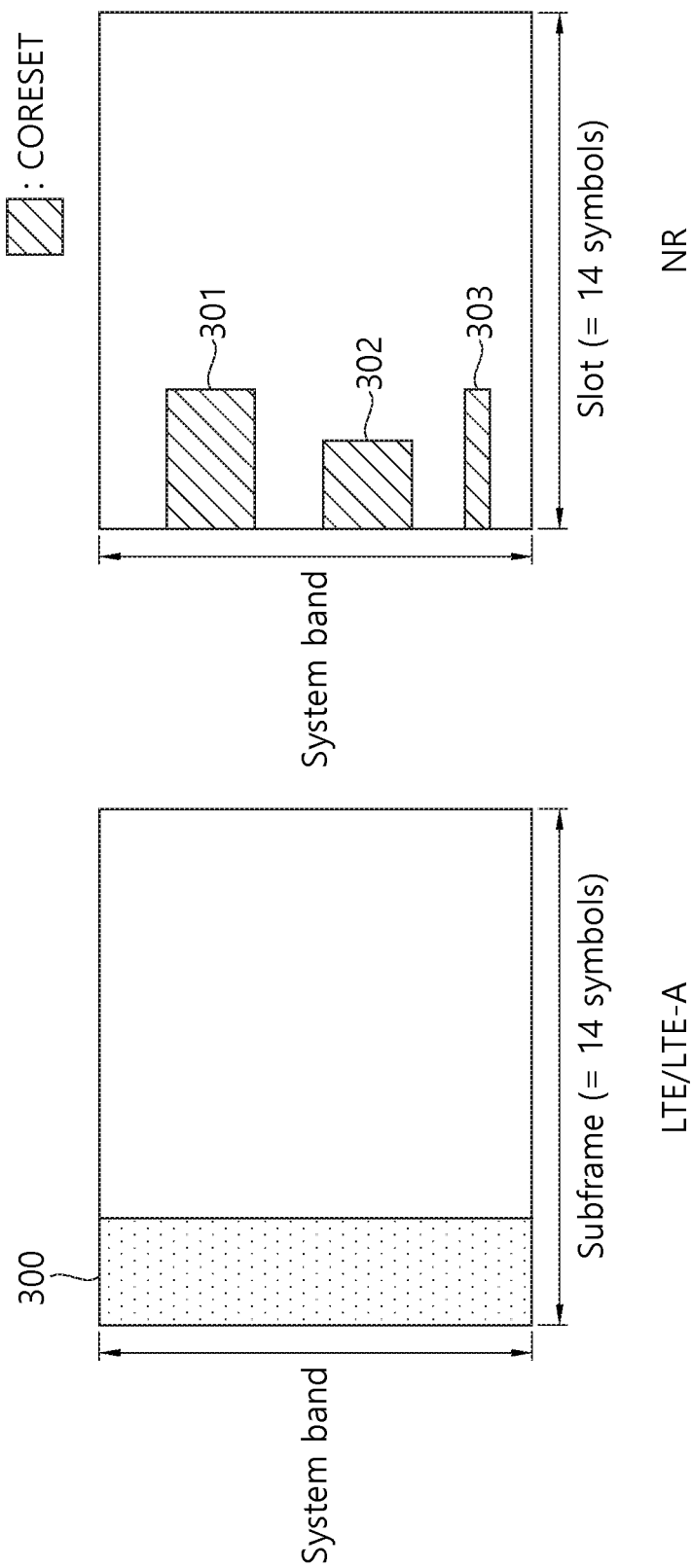
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, in NR, high reliability may be required depending on application fields, and with this requirement, a target block error rate (BLER) for downlink control information (DCI) transmitted through a downlink control channel (for example, physical downlink control channel (PDCCH)) may be significantly lower than that in the legacy technology. In one example of a method for satisfying the requirement for high reliability, the amount of contents included in the DCI may be reduced and/or the amount of resources used for DCI transmission may be increased. At this time, the resources may include at least one of resources in the time domain, frequency domain, code domain, or spatial domain.

In NR, the following techniques/features may be applied.

<Self-Contained Subframe Structure>

Figure 8:
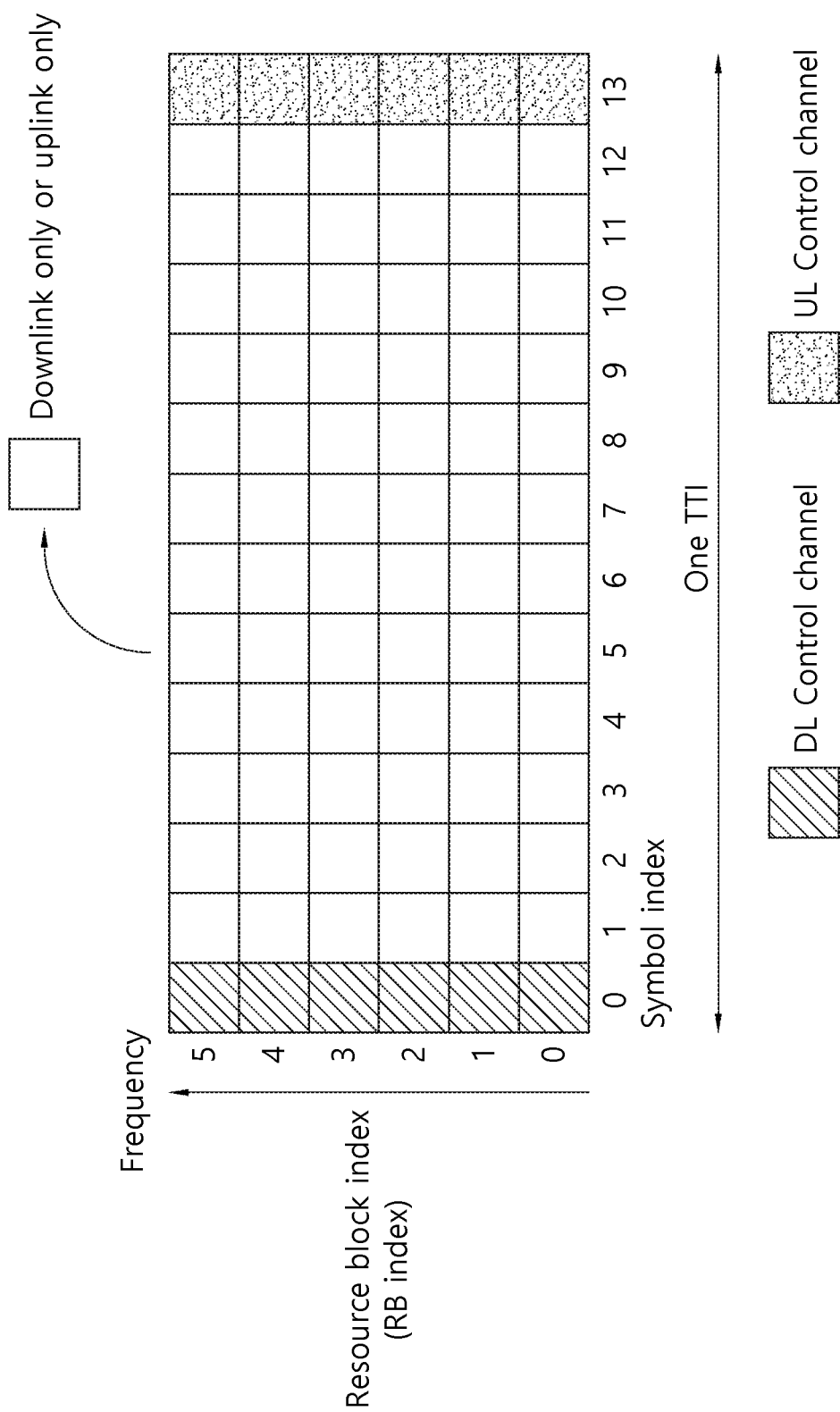
FIG. 8 illustrates one example of a frame structure which may be used in NR.

FIG. 8 illustrates one example of a frame structure which may be used in NR.

As shown in FIG. 8, for the purpose of minimizing latency, NR considers a structure in which a control and data channels are time division multiplexed (TDMed) within one TTI as one of frame structures.

In FIG. 8, the hatched region represents a downlink control region while the region in black color represents an uplink control region. The region without any indication may be used for downlink (DL) data transmission or used for uplink (UL) data transmission. A characterizing feature of such a structure is that DL transmission and UL transmission are performed sequentially to transmit DL data and to receive UL ACK/NACK within a subframe. As a result, the time required to retransmit data at the occurrence of a data transmission error may be reduced, and thereby the latency of final data transmission may be minimized.

In the self-contained subframe structure as described above, a time gap for a gNB and a UE to switch from the transmission mode to the reception mode or vice versa may be needed. To this purpose, in the self-contained subframe structure, part of OFDM symbols at the time of switching from DL to UL transmission may be configured as a guard period (GP).

<Analog Beamforming #1>

Radio waves in the millimeter wave (MMW) band have short wavelengths, which makes a plurality of antenna elements possible on the same area. In other words, in the 30 GHz band, the corresponding wavelength is 1 cm, and a total of 64 (8×8) antenna elements may be installed in a two dimensional array form on a panel of 4 by 4 cm with spacing of 0.5 lambda (wavelength). Therefore, in the mmW band, a plurality of antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource. However, installing TXRUs in all of one hundred or more antenna elements raises an effectiveness issue in terms of costs. Therefore, a method for mapping a plurality of antenna elements to one TXRU and adjusting a beam direction by using an analog phase shifter is being considered. This kind of analog beamforming method has a disadvantage that frequency selective beamforming is not possible because only one beam direction may be implemented over the whole band.

As an intermediate solution between digital beamforming (BF) and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission is limited below B.

<Analog Beamforming #2>

In NR, when a plurality of antennas are used, a hybrid beamforming technique that combines digital beamforming and analog beamforming may be used.

At this time, analog beamforming (or RF beamforming) refers to the operation performing precoding (or combining)

at the RF stage. In the hybrid beamforming, the baseband and RF blocks each perform precoding (or combining), thereby achieving performance comparable to that of digital beamforming while reducing the number of RF chains and D/A (or A/D) converters.

Figure 9:
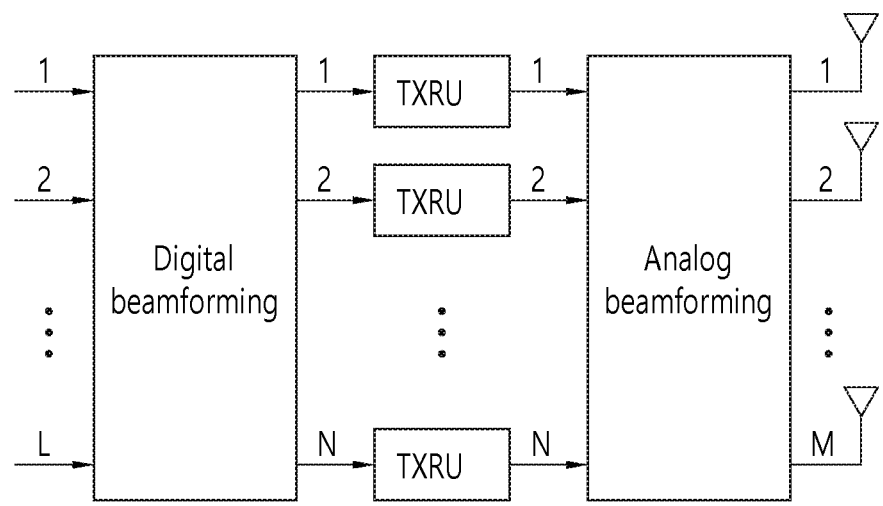
FIG. 9 illustrates a hybrid beamforming structure from the perspectives of TXRUs and physical antennas.

FIG. 9 illustrates a hybrid beamforming structure from the perspectives of TXRUs and physical antennas.

The hybrid beamforming structure may be represented by N transceiver units (TXRUs) and M physical antennas. Then digital beamforming for L data layers to be transmitted from the transmission block may be expressed by an N-by-L matrix, and the N transformed digital signals are converted to analog signals through the TXRUs, for which analog beamforming expressed by an M-by-N matrix is applied.

In NR systems, a gNB is designed to change analog beamforming in units of symbols so that more efficient beamforming is supported for a UE located in a specific area. Furthermore, if N specific TXRUs and M RF antennas are defined as one antenna panel in FIG. 9, the NR system even considers to introduce a plurality of antenna panels to which hybrid beamforming may be applied independently.

As described above, if a gNB uses a plurality of analog beams, analog beams suitable for signal reception may be different for the respective UEs. Therefore, a beam sweeping operation is being considered, which converts, for each symbol, a plurality of analog beams to be applied by the gNB at a specific subframe (SF) at least for a synchronization signal, system information, or paging so that every UE may have a reception opportunity.

Figure 10:
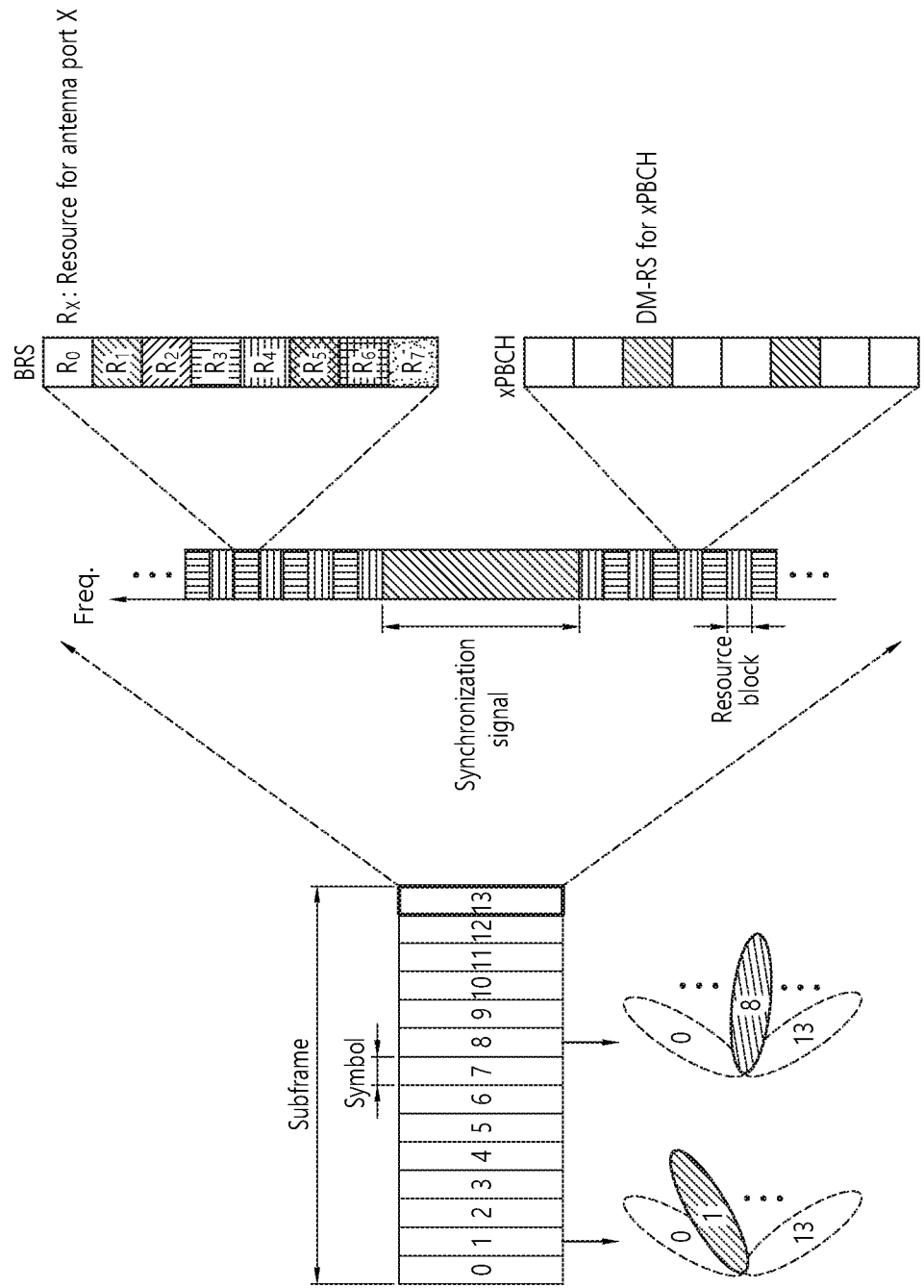
FIG. 10 illustrates the beam sweeping operation for a synchronization signal and system information during a DL transmission process.

FIG. 10 illustrates the beam sweeping operation for a synchronization signal and system information during a DL transmission process.

In FIG. 10, a physical resource (or physical channel) to which system information of the NR system is transmitted according to a broadcasting scheme is referred to as a physical broadcast channel (xPBCH). At this time, analog beams belonging to different antenna panels within one symbol may be transmitted simultaneously, and to measure a channel for each analog beam, a method for adopting a beam reference signal (BRS) is under consideration, which is a reference signal (RS) transmitted by applying a single analog beam (corresponding to a specific antenna panel) as shown in FIG. 10. The BRS may be defined for a plurality of antenna ports, and each antenna port of the BRS may correspond to a single analog beam. At this time, different from the BRS, a synchronization signal or xPBCH may be transmitted by applying all of the analog beams within an analog beam group so as to be received properly by an arbitrary UE.

[Radio Resource Management (RRM) Measurement in the LTE]

The LTE system supports an RRM operation which includes power control, scheduling, cell search, cell reselection, handover, radio link or connection monitoring, and connection establish/re-establish. At this time, a serving cell may request RRM measurement information, which is a measurement value needed to perform the RRM operation, from a UE; typically, in the LTE system, a UE may measure and report cell search information for each cell, reference signal received power (RSRP), or reference signal received quality (RSRQ).

More specifically, in the LTE system, a UE receives 'measConfig' as an upper layer signal for RRM measurement from a serving cell. The UE measures RSRP or RSRQ according to the information of the 'measConfig'. Definitions of the RSRP and RSRP are given as follows.

RSRP may be defined as a linear average of power contributions of resource elements carrying cell-specific reference signals within a measurement frequency band under consideration.

RSRQ may be defined as NxRSRP/(E-UTRA carrier RSSI). Here, N is the number of resource blocks of the E-UTRA carrier RSSI measurement band.

RSSI refers to received broadband power including thermal noise and white noise within a measurement band.

According to the definition, a UE operating in the LTE system may be allowed to measure RSRP over measurement bandwidth corresponding to one of 6, 15, 25, 50, 75, 100 resource blocks (RBs) through information element (IE) related to allowed measurement bandwidth transmitted from system information block type 3 (SIB3) in the case of intra-frequency measurement or through allowed measurement bandwidth transmitted from SIB5 in the case of inter-frequency measurement; or, in the absence of the IE, the UE may measure the RSRP over the whole downlink (DL) system frequency bandwidth by default.

At this time, if the UE receives allowed measurement bandwidth, the UE considers the corresponding value to be the maximum measurement bandwidth and may freely measure the RSRP value within the corresponding value. However, if a serving cell transmits IE defined as wideband-RSRQ and sets the allowed measurement bandwidth to be larger than 50 RBs, the UE has to calculate the RSRP value with respect to the whole allowed measurement bandwidth. Meanwhile, depending on the definition of the RSSI bandwidth, RSSI is measured over the frequency bandwidth allowed for a receiver of the UE.

In what follows, the present disclosure will be described.

In the present disclosure, in a wireless communication system comprising gNBs and UEs, any arbitrary slot (or subframe) may be configured dynamically to be used for downlink (DL) or uplink (UL) transmission. In this case, a method for allocating a physical uplink control channel (PUCCH) resource including at least one of a slot to which a PUCCH carrying at least one information such as HARQ-ACK and channel state information (CSI) is to be transmitted, transmission starting time (=starting symbol), transmission duration, resource block (RB) to be used for transmission, orthogonal cover code (OCC), and cyclic shift (CS) will be proposed.

Recently, 3GPP standards organizations are considering to use a network slicing method which implements a plurality of logical networks on a single physical network in the new radio (NR) system, which is the 5G wireless communication system.

The logical network has to support services having various requirements (for example, enhanced Mobile Broadband (eMBB), Ultra Reliable Low Latency Communication (URLLC), and massive Machine Type Communications (mMTC)). Also, a method for supporting the orthogonal frequency division multiplexing (OFDM) scheme which allows different numerologies according to the various services is considered for the physical layer system of the NR system. In other words, the NR system considers an OFDM scheme (or multiple access scheme) allowing independent numerologies for the respective time and frequency resource regions.

Also, flexibility for supporting various services is considered to be an important design factor in NR systems. When a slot is defined as a scheduling unit, the NR system intends to support a structure in which an arbitrary slot may be dynamically converted to a PDSCH (namely, a physical channel transmitting downlink data) transmission slot (in what follows, DL slot) or to a PUSCH (namely, a physical channel transmitting uplink data) transmission slot (in what follows, UL slot). In what follows, the structure may be referred to as a dynamic DL/UL configuration or dynamic time division duplex (TDD).

When NR system supports the dynamic DL/UL configuration, a physical channel PUCCH which transmits UL control information such as HARQ-ACK information about a PDSCH scheduled over a DL slot and/or CSI may be transmitted from a region allowed for UL transmission.

A gNB may instruct a UE to perform PUCCH transmission through downlink control information (DCI). At this time, a slot to which the PUCCH is to be transmitted, a starting symbol corresponding to the time at which transmission is started within the slot, and transmission duration which indicates how many symbols the slot is transmitted through may be informed. Also, to support a multiplexing scheme by which a plurality of UEs transmit the PUCCH through the same frequency resource within a symbol, PUCCH resources may be allocated and indicated by defining an acknowledge resource indicator (ARI) set which combines a code resource such as orthogonal cover code (OCC) and cyclic shift (CS) with a frequency resource.

In the present disclosure, DL assignment may refer to DCI indicating PDSCH scheduling, and UL grant may refer to DCI indicating PUSCH scheduling. A short PUCCH may refer to a PUCCH having 1-symbol or 2-symbol transmission duration, and a long PUCCH may refer to a PUCCH having transmission duration ranging from 4-symbol to 14-symbol. An ARI PUCCH resource may refer to a PUCCH resource to which uplink control information including HARQ-ACK and CSI may be transmitted, and a CSI PUCCH resource or SR PUCCH resource may refer to an individual PUCCH resource for transmitting CSI and SR, respectively. A multi-beam PRACH may refer to a case in which the direction of a PRACH transmission beam or a PRACH reception beam of a gNB is not fixed but changing.

If it is difficult to satisfy target coverage by using a long PUCCH transmitted from a single slot, one or more slots may transmit the long PUCCH repeatedly (namely, multi-slot long PUCCH transmission may be performed). In addition to the resources that have to be allocated for single-slot long PUCCH transmission, additional information may be required to perform the multi-slot long PUCCH transmission.

The number of UL symbols required to satisfy target coverage, transmission starting position and transmission duration of the long PUCCH in each single slot constituting a multi-slot may be indicated or configured.

Also, since a region allowed for UL transmission varies for each slot when dynamic DL/UL configuration is supported, multi-slot transmission may not be composed of contiguous slots. Therefore, together with the spacing between single-slots constituting the multi-slot, a frequency hopping pattern between slots for obtaining a frequency diversity gain may also be indicated or configured for the UE.

In what follows, the present disclosure proposes a method for indicating a PUCCH format dynamically, a method for allocating and indicating resources of a short PUCCH, and a method for allocating and indicating resources for a PUCCH transmitted through one or more slots, namely multi-TTI.

<Method for Adapting PUCCH Format Dynamically>

Figure 11:
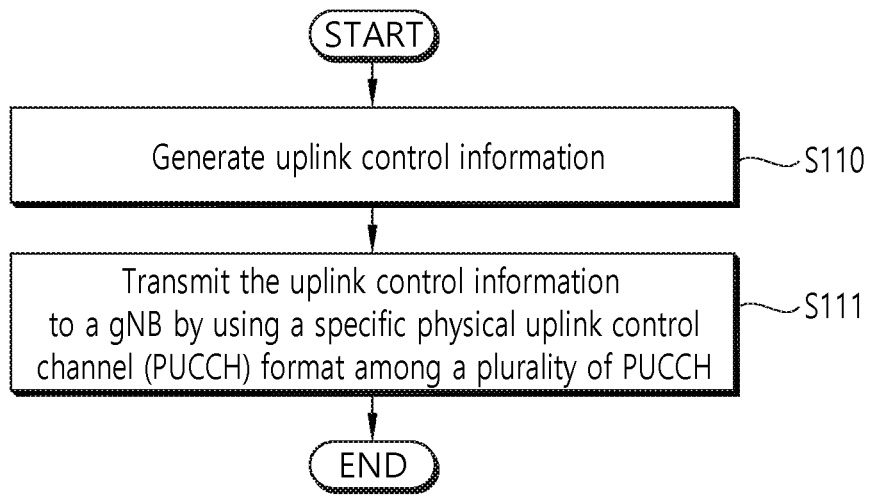
FIG. 11 illustrates a method for transmitting uplink control information by a UE according to one embodiment of the present disclosure.

FIG. 11 illustrates a method for transmitting uplink control information by a UE according to one embodiment of the present disclosure.

Referring to FIG. 11, a UE generates uplink control information S110 and transmits the uplink control information to a gNB by using a specific physical uplink control channel (PUCCH) format among a plurality of PUCCH formats S111.

The specific PUCCH format may be determined based on the number of symbols in the time domain used for transmission of the uplink control information and the number of bits (which may also be called the payload size) of the uplink control information.

For example, the PUCCH transmitting HARQ-ACK for a PDSCH scheduled through DL assignment may have the following PUCCH formats according to the payload size and transmission duration (namely, the number of PUCCH transmission symbols). In other words, examples of the plurality of PUCCH formats are as follows.

(1) PUCCH format 0: A PUCCH having transmission duration of 1-symbol or 2-symbol and transmitting UCI including 1 or 2 bits of HARQ-ACK information in the form of a sequence.

(2) PUCCH format 1: A PUCCH having transmission duration of 4-symbol or more and transmitting UCI including 1 or 2 bits of HARQ-ACK information by using a specific PRB resource. This PUCCH may be transmitted by being multiplexed with other UEs by using OCC and CS resources.

(3) PUCCH format 2: A PUCCH having transmission duration of 1-symbol or 2-symbol and transmitting HARQ-ACK information exceeding 2 bits by FDM with UCI and RS.

(4) PUCCH format 3: A PUCCH having transmission duration of 4-symbol or more and transmitting HARQ-ACK information exceeding X bits (X≥2, for example, X=40) by using a specific PRB(s). This PUCCH is transmitted without being multiplexed with other UEs.

(5) PUCCH format 4: A PUCCH having transmission duration of 4-symbol or more and transmitting HARQ-ACK information exceeding 2 bits and less than or equal to X bits by using a specific PRB resource. This PUCCH may support multiplexing with other UEs.

The gNB may dynamically instruct a UE to transmit HARQ-ACK by using one PUCCH format among the PUCCH formats according to the HARQ-ACK payload size, extent of coverage, or latency requirement.

[Proposed method #1] The PUCCH format may be dynamically indicated in an implicit manner from the size of HARQ-ACK payload to be transmitted by a UE and transmission duration (the number of symbols) of the PUCCH within DCI that instructs PUCCH transmission.

As one example, if the transmission duration of a PUCCH indicated by DCI, upper layer signal (for example, RRC signal), or a combination of both is 1-symbol or 2-symbol, it may be interpreted that the corresponding PUCCH has indicated a short PUCCH format.

Therefore, if HARQ-ACK information to be transmitted is 1-bit or 2-bits, a short PUCCH is transmitted with transmission duration indicated/configured according to the PUCCH format 0; in the case of 2-bits or more, the PUCCH may be transmitted according to the PUCCH format 2.

In the same way, if the HARQ-ACK information is 1-bit or 2-bits, and transmission duration of the PUCCH is indicated to be larger than 4-symbol and smaller than 14-symbol, it may be interpreted that the PUCCH is transmitted according to the PUCCH format 1 while, in the case that the HARQ-ACK information is more than 2-bits, it may be interpreted that the PUCCH is transmitted according to the PUCCH format 3.

The [Proposed method #1] may be applied together with other proposed methods of the present disclosure to the extent that the method #1 does not collide with the other methods.

Figure 12:
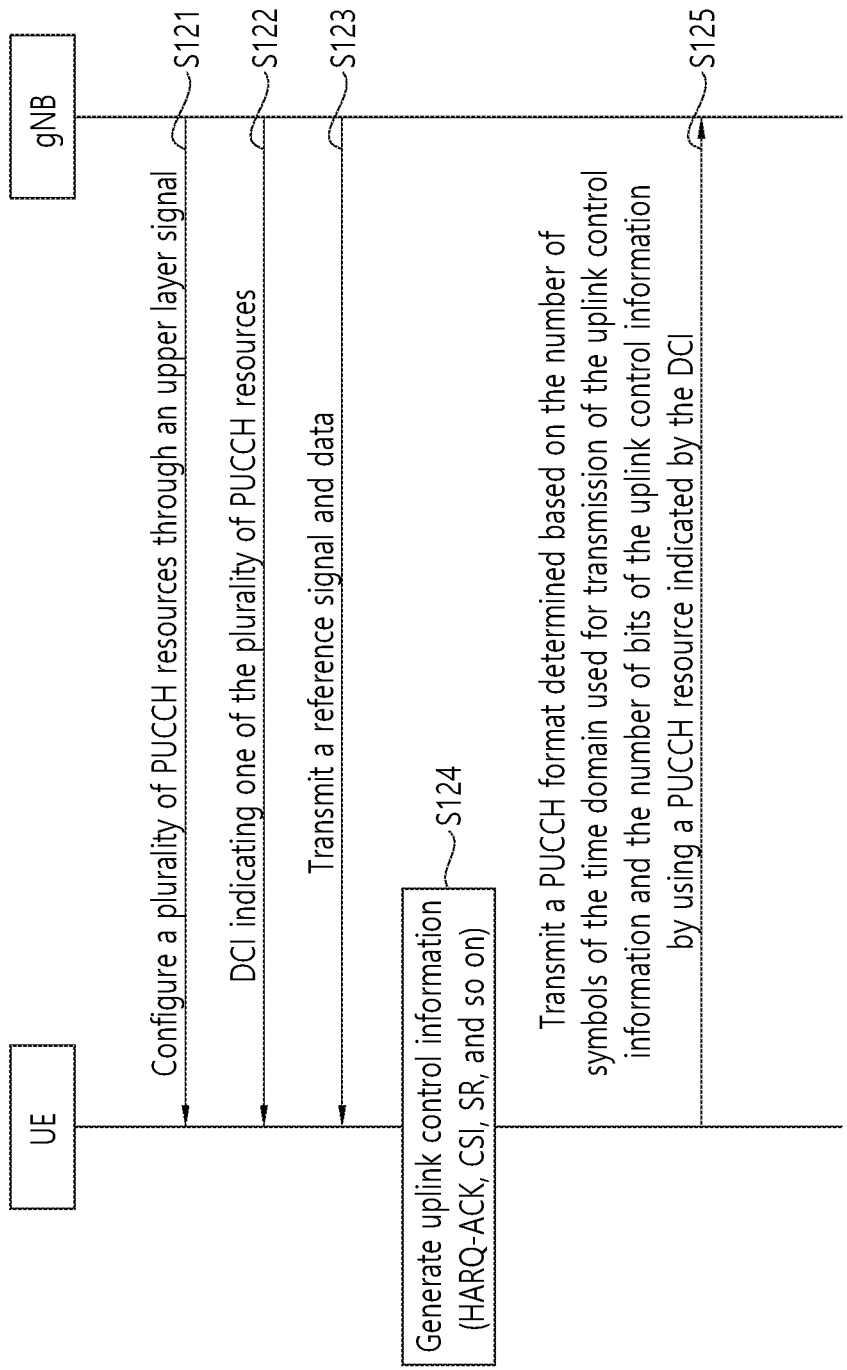
FIG. 12 illustrates a specific example applying a method for transmitting uplink control information by a UE.

FIG. 12 illustrates a specific example applying a method for transmitting uplink control information by a UE.

Referring to FIG. 12, a gNB configures a plurality of PUCCH resources for a UE through an upper layer signal (for example, an RRC signal) S121. At this time, each PUCCH resource may include a plurality of parameters related to PUCCH transmission such as PUCCH transmission starting symbol (start timing) and a physical resource block (PRB) at which PUCCH transmission is started, and the PUCCH resource may be configured by a plurality of gNBs. Each of the plurality of PUCCH resources may also be said to include a parameter related to a first symbol to which a PUCCH is transmitted and a parameter related to a first physical resource block (PRB) to which the PUCCH is transmitted.

The gNB transmits downlink control information (DCI) which indicates one of the plurality of PUCCH resources S122.

The DCI may include a plurality of fields and may inform of an indicated PUCCH resource through one field or two or more fields.

The gNB transmits a reference signal and data S123. The reference signal may be a demodulation reference signal (DM-RS) or a channel state information-reference signal (CSI-RS). The data may be scheduled by the DCI or scheduled by another DCI.

The UE generates uplink control information S124. For example, the UE may generate HARQ-ACK (ACK/NACK) with respect to the data and channels state information that contains measurements of the reference signal.

The UE transmits the PUCCH format, which is determined based on the number of symbols in the time domain used for transmission of the uplink control information and the number of bits of the uplink control information, by using a PUCCH resource indicated by the DCI S125. The PUCCH format may be transmitted within a slot consisting of 14 symbols in the time domain.

In what follows, how a gNB allocates resources for PUCCH transmission by using an upper layer signal and DCI will be described in more detail.

<Method for Allocating Resources of a Short PUCCH in a Single Slot>

[Proposed method #2] For transmission of UCI including HARQ-ACK information of 1-bit or 2-bits, to allocate and indicate a short PUCCH resource consisting of 1-symbol, a gNB may transmit/configure the following information to/for a UE through DCI and an upper layer signal (for example, an RRC signal) or a combination of both.

(1) PUCCH transmission slot timing (which may be called for short "slot timing").

(2) PUCCH transmission starting (symbol) timing (which may be called for short "start timing").

(3) Indication of a PUCCH transmission resource (which may be called for short "ARI value").

It should be noted that the slot timing and start timing may be signaled separately through individual fields within the DCI or jointly coded and signaled through a single field. The ARI value may be signaled in a way that a PUCCH resource set composed of a combination of PRB allocation information and a sequence corresponding to ACK or NACK is configured by an upper layer signal such as the RRC signal separately (for example, differently) for each UE, and one of the resource values is signaled through DCI.

As one example, the gNB may dynamically instruct a UE through a bit field within DCI to transmit uplink control information such as HARQ-ACK to the PUCCH, and the UE may transmit the PUCCH to the gNB by using a specific PUCCH resource in a slot indicated for PUCCH transmission. Here, the specific PUCCH resource may indicate a symbol to which the PUCCH is transmitted within the slot, frequency resource, and sequence resource. The gNB may combine a specific PRB resource within a symbol and a sequence corresponding to ACK or NACK to define an ARI value; and define an ARI set composed of a plurality of ARI values for each individual UE and preconfigure the ARI set for the UE through an upper layer signal (for example, an RRC signal).

The PRB allocation may include information about how many PRBs to use (contiguously or incontiguously) to transmit a sequence among PRBs (available for PUCCH transmission) belonging to a symbol within a slot. If a slot to which a PUCCH is to be transmitted and a symbol to which the PUCCH is transmitted within the corresponding slot are jointly coded by a single field within DCI, the UE may interpret a slot index and a transmission starting symbol mapped to a value indicated by a method agreed on beforehand with the gNB or a predefined look-up table.

The [Proposed method #2] may be applied together with other proposed methods of the present disclosure to the extent that the method #2 does not collide with the other methods.

[Proposed method #3] For transmission of UCI including HARQ-ACK information of 1-bit or 2-bits, to allocate and indicate a short PUCCH resource consisting of 1-symbol, a gNB may transmit/configure the following information to/for a UE through DCI and an upper layer signal (for example, an RRC signal) or a combination of both.

(1) PUCCH transmission slot timing ("slot timing").

(2) PUCCH transmission starting (symbol) timing ("start timing").

(3) Indication of a PUCCH transmission resource ("ARI value").

It should be noted that the slot timing may be signaled by an individual field within DCI, and a PUCCH resource composed of a combination of the start timing, PRB allocation information, and a sequence corresponding to ACK or NACK may be jointly coded and signaled through a single ARI field. To this purpose, first, a plurality of PUCCH resources composed of a combination of PUCCH start timing and a sequence may configure a PUCCH resource set corresponding to each ARI value in advance through an upper layer signal (for example, an RRC signal). In other words, a PUCCH resource set may include a plurality of PUCCH resources, and each PUCCH resource within the PUCCH resource set may correspond to each ARI value. Here, the PUCCH resource may be a combination of various parameters needed for transmission of the PUCCH, like PUCCH start timing and a combination of sequences.

As one example, the gNB dynamically instructs a UE through a bit field within DCI to transmit uplink control information such as HARQ-ACK to the PUCCH, and the UE transmits the PUCCH to the gNB by using a specific resource in a slot indicated for PUCCH transmission. Here, the specific PUCCH resource may indicate a combination of a plurality of parameters such as a symbol to which a PUCCH is transmitted within a slot, a frequency resource, a sequence resource. The gNB may combine start timing at which PUCCH transmission is started, a specific PRB resource within a symbol, and a sequence corresponding to ACK or NACK to define an ARI value; and define an ARI set composed of a plurality of ARI values for each individual UE and preconfigure the ARI set for the UE through an upper layer signal (for example, an RRC signal).

The PRB allocation may include information about how many PRBs to use contiguously or incontiguously to transmit a sequence among PRBs available for PUCCH transmission belonging to a symbol within a slot. If a slot to which a PUCCH is to be transmitted and a symbol to which the PUCCH is transmitted within the corresponding slot are jointly coded by a single field within DCI, the UE may interpret a slot index and a transmission starting symbol mapped to a value indicated by a method agreed on beforehand with the gNB or a predefined look-up table.

The [Proposed method #3] may be applied together with other proposed methods of the present disclosure to the extent that the method #3 does not collide with the other methods.

When the [Proposed method #2 and #3] are put together in a table, they may be summarized as shown in Table 4. Table 4 summarizes a method for allocating resources with respect to a short PUCCH which transmits UCI of up to 2 bits and which is composed of 1 symbol, namely, the proposed method #2 and #3.

TABLE 4

| | Slot position: A | Starting symbol position: B | ARI | |
|---|---|---|---|---|
| Proposed method #2 | Indicated by DCI | Indicated by DCI | PRB allocation, code/sequence index | Both A and B may be indicated together |
| Proposed method #3 | Indicated by DCI | Included in ARI | PRB allocation, code/sequence index starting symbol position | |

[Proposed method #4] To allocate and indicate a short PUCCH resource composed of 1-symbol for transmission of UCI of 2 bits or more, a gNB may transmit/configure the following information to/for a UE through DCI and an upper layer signal (for example, an RRC signal) or a combination of both.

(4) PUCCH transmission slot timing ("slot timing").
(5) PUCCH transmission starting (symbol) timing ("start timing").
(6) Indication of a PUCCH transmission resource ("ARI value").

It should be noted that the slot timing and start timing may be signaled separately through individual fields within the DCI or jointly coded and signaled through a single field. The ARI value may indicate PRB allocation information, and an ARI set composed of a plurality of ARI values may be configured by an upper layer signal such as the RRC signal separately (for example, differently) for each UE, and one of the ARI values may be signaled through DCI.

As one example, the gNB may dynamically instruct a UE through a bit field within DCI to transmit uplink control information such as HARQ-ACK to the PUCCH, and the UE may transmit the PUCCH to the gNB by using a specific resource in a slot indicated for PUCCH transmission. Here, the specific PUCCH resource may indicate a symbol to which the PUCCH is transmitted within the slot and a frequency resource. The gNB may define a specific PUCCH resource within a symbol to be mapped to one ARI value and define an ARI set composed of a plurality of ARI values for each individual UE and preconfigure the ARI set for the UE through an upper layer signal (for example, an RRC signal).

The PRB allocation may include information about how many PRBs to use (contiguously or incontiguously) to transmit a PUCCH among PRBs (available for PUCCH transmission) belonging to a symbol within a slot. If a slot to which a PUCCH is to be transmitted and a symbol to which the PUCCH is transmitted within the corresponding slot are jointly coded by a single field within DCI, the UE may interpret a slot index and a transmission starting symbol mapped to a value indicated by a method agreed on beforehand with the gNB or a predefined look-up table.

The [Proposed method #4] may be applied together with other proposed methods of the present disclosure to the extent that the method #4 does not collide with the other methods.

[Proposed method #5] To allocate and indicate a short PUCCH resource composed of 1-symbol for transmission of UCI of 2 bits or more, a gNB may transmit/configure the following information to/for a UE through DCI and an upper layer signal (for example, an RRC signal) or a combination of both.

(4) PUCCH transmission slot timing ("slot timing").
(5) PUCCH transmission starting (symbol) timing ("start timing").
(6) Indication of a PUCCH transmission resource ("ARI value").

It should be noted that the slot timing may be signaled through an individual field within the DCI, and a PUCCH resource composed of the start timing and PRB allocation information may be jointly coded and signaled through an individual (ARI) field. To this purpose, first, a PUCCH resource set in which a plurality of PUCCCH resources composed of a combination of PUCCH start timing and a sequence correspond to the respective ARI values may be configured in advance through an upper layer signal (for example, an RRC signal).

As one example, the gNB dynamically instructs a UE through a bit field within DCI to transmit uplink control information such as HARQ-ACK to the PUCCH, and the UE transmits the PUCCH to the gNB by using a specific resource in a slot indicated for PUCCH transmission. Here, the specific PUCCH resource may indicate a symbol to which a PUCCH is transmitted within a slot, a frequency resource, and a sequence resource. The gNB may combine start timing at which PUCCH transmission is started and a specific PRB resource within a symbol to define an ARI value; and define an ARI set composed of a plurality of ARI values for each individual UE and preconfigure the ARI set for the UE through an upper layer signal (for example, an RRC signal).

The PRB allocation may include information about how many PRBs to use (contiguously or incontiguously) to transmit a sequence among PRBs (available for PUCCH transmission) belonging to a symbol within a slot. If a slot to which a PUCCH is to be transmitted and a symbol to which the PUCCH is transmitted within the corresponding slot are jointly coded by a single field within DCI, the UE may interpret a slot index and a transmission starting symbol mapped to a value indicated by a method agreed on beforehand with the gNB or a predefined look-up table.

The [Proposed method #5] may be applied together with other proposed methods of the present disclosure to the extent that the method #5 does not collide with the other methods.

When the [Proposed method #4 and #5] are put together in a table, they may be summarized as shown in Table 5. Table 5 summarizes a method for allocating resources with respect to a short PUCCH which transmits UCI exceeding 2 bits and which is composed of 1 symbol, namely, the proposed method #4 and #5.

TABLE 5

|  | Slot position: A | Starting symbol position: B | ARI |  |
| --- | --- | --- | --- | --- |
| Proposed method #4 | Indicated by DCI | Indicated by DCI | PRB allocation | Both A and B may be indicated together |
| Proposed method #5 | Indicated by DCI | Included in ARI | PRB allocation, starting symbol position |  |

[Proposed method #6] Method for allocating and indicating a 2-symbol short PUCCH If it is difficult to satisfy target coverage by using a short PUCCH composed of 1-symbol (1-symbol short PUCCH), a UE may use an additional UL symbol to transmit a short PUCCH composed of 2-symbol. Resources for transmission of a short PUCCH composed of 2-symbol (2-symbol short PUCCH) also differ according to the payload size of UCI as described above. The short PUCCH composed of 2-symbol may have a form in which a structure such as the short PUCCH composed of 1-symbol is repeated twice in the time domain when the HARQ-ACK payload size of UCI amounts to up to 2 bits, or when the HARQ-ACK payload size of UCI is more than 2 bits, a structure performing FDM of coded UCI bits and RS is applied to the 2-symbol.

The proposed method above may be extended for a method for allocating and indicating resources of the short PUCCH composed of 2-symbol. More specifically, when the maximum HARQ-ACK payload size of the UCI is 2 bits, [Proposed method #2] or [Proposed method #3] may be applied while, if the HARQ-ACK payload size of UCI is more than 2 bits, the [Proposed method #4] or [Proposed method #5] may be applied. It should be noted, however, that in the case of 1-symbol short PUCCH, an arbitrary symbol configured as a region allowed for UL transmission may become starting position, but in the case of 2-symbol PUCCH, at least the last symbol within a slot is not allowed to become a transmission starting symbol.

The [Proposed method #6] may be applied together with other proposed methods of the present disclosure to the extent that the method #6 does not collide with the other methods.

<Method for Allocating Resources when the PUCCH Format is Dynamic and Method for Allocating Resources of a Multi-Slot Long PUCCH>

Table 6 and Table 7 below summarize methods for allocating resources of a long PUCCH according to the size of HARQ-ACK information bits in a single slot.

More specifically, Table 6 summarizes a method for allocating resources of a long PUCCH that transmits UCI of up to 2 bits.

TABLE 6

|  | Slot position: A | Starting symbol position: B | Number of symbols: C | ARI (D) |  |
| --- | --- | --- | --- | --- | --- |
| Option 1 | Indicated by DCI | Indicated by DCI | Indicated by DCI | PRB allocation, OCC, CS | B and C may be indicated together |
| Option 2 | Indicated by DCI | Indicated by DCI | Configured by RRC | PRB allocation, OCC, CS | A and B maybe indicated together |
| Option 3 | Indicated by DCI | Indicated by DCI | Included in ARI | PRB allocation, OCC, CS, number of symbols | A and B may be indicated together |
| Option 4 | Indicated by DCI | Included in ARI | Included in ARI | PRB allocation, OCC, CS, starting symbol position, number of symbols |  |

Table 7 summarizes a method for allocating resources for a long PUCCH which is incapable of multiplexing and transmits UCI exceeding 2-bits.

TABLE 7

|  | Slot position: A | Starting symbol position: B | Number of symbols: C | ARI (D) |  |
| --- | --- | --- | --- | --- | --- |
| Option 1 | Indicated by DCI | Indicated by DCI | Indicated by DCI | PRB allocation | B and C may be indicated together |
| Option 2 | Indicated by DCI | Indicated by DCI | Configured by RRC | PRB allocation | A and B may be indicated together |
| Option 3 | Indicated by DCI | Indicated by DCI | Included in ARI | PRB allocation, number of symbols | A and B may be indicated together |
| Option 4 | Indicated by DCI | Included in ARI | Include in ARI | PRB allocation, starting symbol position, number of symbols |  |

[Proposed method #7] Method for indicating transmission duration (number of transmission symbols) of a long PUCCH When transmission duration of a long PUCCH within a single slot is indicated to a UE, 4-symbol up to 14-symbol may be transmitted; therefore, a maximum of 4 bits are needed to dynamically indicate all of the possible transmission durations. Therefore, rather than dynamically indicate all the transmission durations, it may be desirable to configure a few of specific transmission durations semi-statically for a UE by using an upper layer signal such as an RRC signal and then to dynamically indicate one of the transmission durations through DCI.

As one example, if a UE is configured semi-statically with a total of four typical transmission durations 5-symbol, 8-symbol, 11-symbol, and 14-symbol through an RRC signal, one of the four transmission durations may be dynamically indicated to the UE by using 2 bits within DCI.

The [Proposed method #7] may be applied together with other proposed methods of the present disclosure to the extent that the method #7 does not collide with the other methods.

[Proposed method #8] Method for allocating and indicating resources when the PUCCH format is dynamic If Tables 6 and 7 are further generalized so that transmission duration of a PUCCH is dynamically indicated through number of symbol field within the DCI, the PUCCH format may be determined implicitly as in the [Proposed method #1] depending on the indicated transmission duration, and resources suitable for the corresponding PUCCH format may be allocated and indicated.

As one example, if transmission duration indicated by DCI is 1-symbol or 2-symbol, the PUCCH format indicated by the corresponding DCI is a short PUCCH, and if HARQ-ACK information requires up to 2 bits according to the payload size of UCI, the ARI value of Table 6 may be interpreted as a combination of a PRB resource and a sequence corresponding to ACK or NACK as in the [Proposed method #2] (refer to Table 4).

As one example, if transmission duration indicated by DCI is 4-symbol or more, the PUCCH format indicated by the corresponding DCI is a long PUCCH, and if HARQ-ACK information is more than 2 bits according to the size of UCI payload, it may be interpreted to be PRB allocation as indicated by the ARI value of Table 7.

The [Proposed method #8] may be applied together with other proposed methods of the present disclosure to the extent that the method #8 does not collide with the other methods.

In what follows, a method for allocating and indicating resources when a long PUCCH is transmitted over multiple slots will be described. In the same way for a short PUCCH composed of 2-symbol described above, if it is difficult to satisfy target coverage by using a long PUCCH transmitted from a single slot, one or more slots may transmit the long PUCCH repeatedly.

In addition to the elements that have to be allocated and indicated to transmit a long PUCCH in a single slot, additional information may be needed to transmit a long PUCCH over multiple slots. For example, the number of UL symbols required for a UE to satisfy target coverage and transmission starting position and transmission duration of the long PUCCH in the individual slots constituting the multi-slot may have to be indicated or configured.

Also, since the region allowed for UL transmission varies for each slot in a dynamic TDD operation, multi-slot transmission may not be performed through contiguous slots. Therefore, spacing between individual slots constituting the multi-slot and a frequency hopping pattern between slots to obtain a frequency diversity gain may also have to be indicated to or configured for a UE.

[Proposed method #9] A UE may have been configured semi-statically with the following parameters through an upper layer signal (for example, an RRC signal) by a gNB.

1. The number of symbols X required to satisfy target coverage, 2. the number of symbols Y of a long PUCCH transmitted in each slot (where Y is a natural number such that $4 \leq Y \leq 14$), 3. starting position at which transmission of a long PUCCH is started within each slot, 4. spacing between slots (unit: slot).

Figure 13:
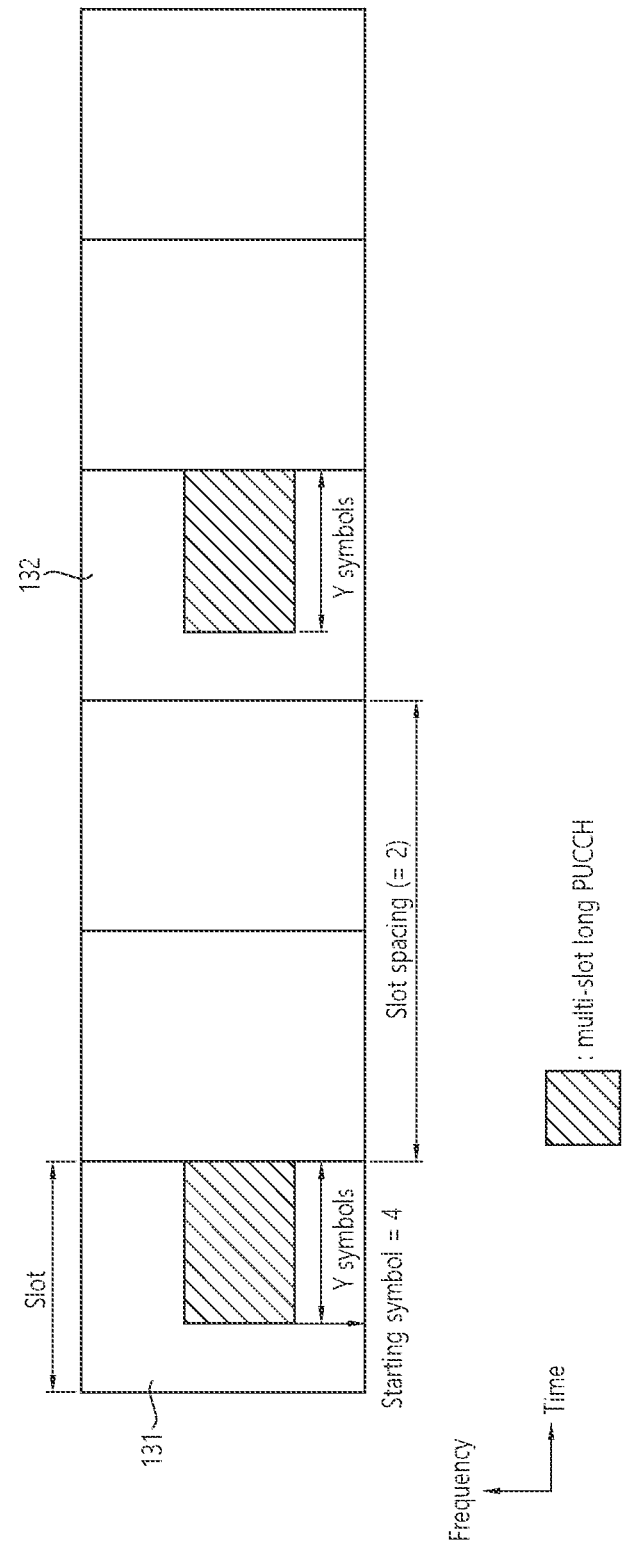
FIG. 13 illustrates parameters configured for a UE by a base station.

FIG. 13 illustrates parameters configured for a UE by a gNB.

Referring to FIG. 13, a long PUCCH may be transmitted through Y symbols within a slot. At this time, the Y value may be configured by the gNB. Also, the long PUCCH may be transmitted over multiple slots. FIG. 13 illustrates a case where a long PUCCH is transmitted in two slots (131, 132), the slot spacing of which is 2. It should be noted that the example is intended only to help understanding and does not limit the present disclosure.

In FIG. 13, the '3. Starting position at which transmission of a long PUCCH is started within each slot' is orthogonal frequency division multiplexing (OFDM) symbol 4, and the '4. Spacing between slots' is 2.

Among the parameters configured by the gNB, the UE may calculate the total number of aggregated slots required for transmission based on the number of symbols X required to satisfy target coverage and the number of symbols Y of a long PUCCH transmitted in each slot. For example, the total number of aggregated slots may be calculated by using ceil(X/Y). ceil(N) returns the smallest integer among integers larger than N.

Also, before being reconfigured by the gNB, the UE may transmit a multi-slot long PUCCH based on the number of symbols of the long PUCCH and slot spacing configured at the transmission starting position where the UE is regularly configured within each slot whenever the multi-slot long PUCCH transmission is instructed.

Here, the slot spacing may be configured to be the same between slots, or a slot to which the long PUCCH is to be transmitted may be configured through an RRC signal by using one of a plurality of predetermined time patterns or a bitmap format. Also, to obtain the frequency diversity gain, one of a plurality of frequency hopping patterns may be configured by an upper layer signal.

As one example, when X=21, Y=5, and transmission starting position and slot spacing are configured to be 4 and 2, respectively, the UE may calculate the number of aggregated slots required as ceil(21/5)=5. And each time multi-slot long PUCCH transmission is instructed, the UE may transmit a long PUCCH through 5 symbols starting from the fourth symbol within a slot and transmit the long PUCCH repeatedly through 5 contiguous slots separated by 2 slots from the others.

The [Proposed method #9] may be applied together with other proposed methods of the present disclosure to the extent that the method #9 does not collide with the other methods.

[Proposed method #10] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that $4 \leq Y \leq 14$), 3. starting position at which transmission of a long PUCCH is started within each slot, 4. spacing between slots (unit: slot).

Among the parameters, the number of symbols X required to satisfy target coverage, the number of symbols Y of a long PUCCH transmitted in each slot, and starting position at which transmission of a long PUCCH is started within each slot may be configured semi-statically by an upper layer signal such as an RRC signal; and spacing between slots may be indicated dynamically through DCI.

Among the parameters configured by the gNB, the UE may calculate the total number of aggregated slots required for transmission based on the number of symbols X required to satisfy target coverage and the number of symbols Y of a long PUCCH transmitted in each slot by using ceil(X/Y), for example.

Before being reconfigured by the gNB, the UE may transmit a long PUCCH at the transmission starting position where the UE is regularly configured within each slot whenever the multi-slot long PUCCH transmission is instructed. Spacing between slots constituting the multi-slot long PUCCH may vary according to slot spacing indicated dynamically within DCI that triggers the multi-slot long PUCCH transmission.

Here, the slot spacing may be configured to be the same between slots, or a slot to which the long PUCCH is to be transmitted may be indicated through DCI or a bitmap format while a plurality of predetermined time patterns are configured in advance.

Also, to obtain the frequency diversity gain, one of a plurality of frequency hopping patterns may be configured by an upper layer signal. Also, through DCI instructing multi-slot long PUCCH transmission, spacing between slots constituting the multi-slot long PUCCH may be indicated dynamically.

As one example, when X=21, Y=5, transmission starting position is configured to be 4, and DCI instructing multi-slot long PUCCH transmission indicates the slot spacing to be 2, the UE may calculate the number of aggregated slots required as ceil(21/5)=5. Each time multi-slot long PUCCH transmission is instructed, the UE may transmit a long PUCCH through 5 symbols starting from the fourth symbol within a slot and transmit the long PUCCH through the 5 contiguous slots separated by 2 slots from the others. If DCI instructing the next multi-slot long PUCCH transmission indicates the slot spacing to be 4, the long PUCCH may still be transmitted at the same starting position through the same number of symbols based on the aforementioned number of aggregated slots, but the long PUCCH may be transmitted through 5 contiguous slots separated by 4 slots from the others.

The [Proposed method #10] may be applied together with other proposed methods of the present disclosure to the extent that the method #10 does not collide with the other methods.

[Proposed method #11] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the number of symbols X required to satisfy target coverage, the number of symbols Y of a long PUCCH transmitted in each slot, and spacing of slots constituting a multi-slot long PUCCH may be configured semi-statically by an upper layer signal such as an RRC signal; and the starting position at which transmission of a long PUCCH is started within each slot may be indicated through an individual DCI field or jointly coded to be dynamically indicated by a single field.

Among the parameters configured by the gNB, the UE may calculate the total number of aggregated slots required for transmission based on the number of symbols X required to satisfy target coverage and the number of symbols Y of a long PUCCH transmitted in each slot by using ceil(X/Y), for example.

The number of symbols X required to satisfy target coverage and spacing between slots constituting a multi-slot long PUCCH always use the same configured values until they are reconfigured by a gNB; and transmission starting position of a long PUCCH may be changed to a symbol position indicated by the corresponding DCI each time multi-slot long PUCCH transmission is indicated. Also, DCI instructing multi-slot long PUCCH transmission may dynamically indicate the starting position of a long PUCCH in each slot constituting the multi-slot long PUCCH.

The slot spacing may be configured to be the same between slots, or a slot to which the long PUCCH is to be transmitted may be configured by using an RRC signal according to one of a plurality of predetermined time patterns or a bitmap format. Also, to obtain the frequency diversity gain, one of a plurality of frequency hopping patterns may be configured by an upper layer signal.

As one example, when X=21, Y=5, transmission starting position is configured to be 2, transmission starting position is configured to be 4, and DCI indicating a multi-slot long PUCCH indicates the starting position to be 4, the UE may calculate the number of aggregated slots required as ceil(21/5)=5; and if multi-slot long PUCCH transmission is instructed, the UE may transmit a long PUCCH through 5 symbols starting from the fourth symbol within slots separated by 2 slots from the others. If DCI indicating the next multi-slot long PUCCH indicates the starting position to be 5, the long PUCCH may be transmitted by using the 5th symbol as the starting position through 5 contiguous slots separated by the same slot spacing from the others in as many as the same number of symbols based on the aforementioned number of aggregated slots.

The [Proposed method #11] may be applied together with other proposed methods of the present disclosure to the extent that the method #11 does not collide with the other methods.

[Proposed method #12] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the gNB may configure the number of symbols X required to satisfy target coverage and the number of symbols Y of a long PUCCH transmitted in each slot semi-statically by using an upper layer signal such as an RRC signal; and spacing of slots constituting a multi-slot long PUCCH and the starting position at which transmission of a long PUCCH is started within each slot may be indicated through an individual DCI field or jointly coded to be dynamically indicated by a single field.

Among the parameters configured by the gNB, the UE may calculate the total number of aggregated slots required for transmission based on the number of symbols X required to satisfy target coverage and the number of symbols Y of a long PUCCH transmitted in each slot by using ceil(X/Y), for example.

The number of symbols X required to satisfy target coverage and spacing between slots constituting a multi-slot long PUCCH always use the same configured values until they are reconfigured by a gNB; and transmission starting position of a long PUCCH may be changed to a symbol position indicated by the corresponding DCI each time multi-slot long PUCCH transmission is indicated.

Also, within DCI indicating a multi-slot long PUCCH, the starting position and spacing of a long PUCCH in each slot constituting the multi-slot long PUCCH may be dynamically indicated. Also, when the parameter 3 and 4 among the parameters above are jointly coded to be indicated by one DCI field, a plurality of combinations of the parameter 3 and 4 may be configured by an upper layer signal in advance, and one of the combinations may be indicated by DCI.

The slot spacing may be configured to be the same between slots, or a slot to which the long PUCCH is to be transmitted may be indicated through DCI or a bitmap format while a plurality of predetermined time patterns are configured in advance. Also, to obtain the frequency diversity gain, one of a plurality of frequency hopping patterns may be configured by an upper layer signal.

As one example, if X=21, Y=5, and DCI indicating a multi-slot long PUCCH indicates the transmission starting position and slot space to be 4 and 2, respectively, the UE may calculate the required number of aggregated slots as ceil(21/5)=5 and if multi-slot long PUCCH transmission is instructed, transmits a long PUCCH through 5 symbols starting from the fourth symbol within 5 slots separated by 2 slots from the other slots. If DCI indicating the next multi-slot long PUCCH indicates the starting position to be 5 and slot spacing to be 1, the long PUCCH may be transmitted by using the 5th symbol as the starting position within each of 5 slots separated by 1 slot spacing from the others in as many as 5 symbols based on the aforementioned number of aggregated slots.

The [Proposed method #12] may be applied together with other proposed methods of the present disclosure to the extent that the method #12 does not collide with the other methods.

[Proposed method #13] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the number of symbols X required to satisfy target coverage, spacing of slots constituting a multi-slot long PUCCH, and the starting position at which transmission of a long PUCCH is started within each slot may be indicated semi-statically by using an upper layer signal such as an RRC signal; and the number of symbols Y of a long PUCCH transmitted in each slot may be indicated dynamically through DCI.

Among the parameters configured by the gNB, the UE may calculate the total number of aggregated slots required for transmission based on the number of symbols X required to satisfy target coverage and the number of symbols Y of a long PUCCH transmitted in each slot, which is indicated by DCI indicating a multi-slot long PUCCH, by using ceil(X/Y), for example.

The number of symbols X required to satisfy target coverage, spacing between slots constituting a multi-slot long PUCCH, and transmission starting position of a long PUCCH may use the same configured values until they are reconfigured by a gNB. The number of symbols of a long PUCCH within each slot may be indicated through DCI and transmitted differently for each multi-slot long PUCCH. Also, DCI indicating a multi-slot long PUCCH may dynamically indicate the number of symbols of a long PUCCH in each slot constituting the multi-slot long PUCCH.

The slot spacing may be configured to be the same between slots, or a slot to which the long PUCCH is to be transmitted may be configured by using an RRC signal according to one of a plurality of predetermined time patterns or a bitmap format. Also, to obtain the frequency diversity gain, one of a plurality of frequency hopping patterns may be configured by an upper layer signal.

As one example, when X=21, transmission starting position and slot spacing are configured to be 4 and 2, respectively, and DCI indicating a multi-slot long PUCCH indicates the number of symbols transmitted in each slot to be Y=5, the UE may calculate the number of aggregated slots required as ceil(21/5)=5. If multi-slot long PUCCH transmission is instructed by DCI, a long PUCCH is transmitted through 5 symbols starting from the fourth symbol in each of 5 slots separated by 2 slots from the others. If DCI indicating the next multi-slot long PUCCH indicates the number of symbols transmitted in each slot to be Y=7, the UE may calculate the number of aggregated slots required as ceil(21/7)=3 and transmits a long PUCCH having a length of 7 symbols through 3 slots by using the transmission starting position and slot spacing configured the same as the example above.

The [Proposed method #13] may be applied together with other proposed methods of the present disclosure to the extent that the method #13 does not collide with the other methods.

[Proposed method #14] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the number of symbols X required to satisfy target coverage and the starting position at which transmission of a long PUCCH is started within each slot constituting a multi-slot long PUCCH may be configured semi-statically by using an upper layer signal such as an RRC signal; and the number of symbols Y of a long PUCCH transmitted in each slot and slot spacing may be indicated through individual fields within DCI or jointly coded to be dynamically indicated through a single field.

Among the parameters configured by the gNB, the UE may calculate the total number of aggregated slots required for transmission based on the number of symbols X required to satisfy target coverage and the number of symbols Y of a long PUCCH transmitted in each slot, which is indicated by DCI indicating a multi-slot long PUCCH, by using ceil(X/Y), for example.

The number of symbols X required to satisfy target coverage and transmission starting position of a long PUCCH within each slot constituting a multi-slot long PUCCH may use the same configured values until they are reconfigured by a gNB; and slot spacing may be indicated through DCI and transmitted differently for each multi-slot long PUCCH.

Also, DCI indicating a multi-slot long PUCCH may dynamically indicate the number of symbols of a long PUCCH in each slot constituting the multi-slot long PUCCH and slot spacing. And when the parameter 2 and 4 are jointly coded to be indicated by one DCI field, a plurality of combinations of the parameter 2 and 4 may be configured by an upper layer signal in advance, and one of the combinations may be indicated by DCI.

The slot spacing may be configured to be the same between slots, or a slot to which the long PUCCH is to be transmitted may be indicated through DCI or a bitmap format while a plurality of predetermined time patterns are configured in advance. Also, to obtain the frequency diversity gain, one of a plurality of frequency hopping patterns may be configured by an upper layer signal.

As one example, when X=21, transmission starting position is configured to be 4, DCI indicating a multi-slot long PUCCH indicates the number of symbols transmitted in each slot to be Y=5, and spacing between slots is indicated to be 2, the UE may calculate the number of aggregated slots required as ceil(21/5)=5. And if multi-slot long PUCCH transmission is instructed by DCI, a long PUCCH is transmitted through 5 symbols starting from the fourth symbol in each of 5 slots separated by 2 slots from the others. If DCI indicating the next multi-slot long PUCCH indicates the number of symbols transmitted in each slot to be Y=7 and spacing between slots to be 1-slot, the UE may calculate the number of aggregated slots required as ceil(21/7)=3 and transmits a long PUCCH having a length of 7 symbols through 3 slots separated by 1-slot spacing from the others by using the transmission starting position configured the same as the example above.

The [Proposed method #14] may be applied together with other proposed methods of the present disclosure to the extent that the method #14 does not collide with the other methods.

[Proposed method #15] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the number of symbols X required to satisfy target coverage and spacing between slots constituting a multi-slot long PUCCH may be configured semi-statically by using an upper layer signal such as an RRC signal; and starting position at which transmission of a long PUCCH is started within each slot constituting the multi-slot long PUCCH and the number of symbols Y of the long PUCCH transmitted in each slot may be indicated through individual fields within DCI or jointly coded to be dynamically indicated through a single field.

Among the parameters configured by the gNB, the UE may calculate the total number of aggregated slots required for transmission based on the number of symbols X required to satisfy target coverage and the number of symbols Y of a long PUCCH transmitted in each slot, which is indicated by DCI indicating a multi-slot long PUCCH, by using ceil(X/Y), for example.

The number of symbols X required to satisfy target coverage and spacing between slots constituting a multi-slot long PUCCH may use the same configured values until they are reconfigured by a gNB; and transmission starting position of a long PUCCH may be indicated through DCI and transmitted differently for each multi-slot long PUCCH.

The slot spacing may be configured to be the same between slots, or a slot to which the long PUCCH is to be transmitted may be configured by using an RRC signal according to one of a plurality of predetermined time patterns of a bitmap format. Also, to obtain the frequency diversity gain, one of a plurality of frequency hopping patterns may be configured by an upper layer signal. Also, DCI indicating a multi-slot long PUCCH may dynamically indicate the number of symbols of a PUCCH in each slot constituting the multi-slot long PUCCH and starting position. And when the parameter 2 and 3 are jointly coded to be indicated by one DCI field, a plurality of combinations of the parameter 2 and 3 may be configured by an upper layer signal in advance, and one of the combinations may be indicated by DCI.

As one example, when X=21, spacing between slots is configured to be 2, and DCI indicating a multi-slot long PUCCH indicates the number of symbols transmitted in each slot to be Y=5 and transmission starting position of a long PUCCH within each slot to be 4, the UE may calculate the number of aggregated slots required as ceil(21/5)=5; if multi-slot long PUCCH transmission is instructed by DCI, a long PUCCH is transmitted through 5 symbols starting from the fourth symbol in each of 5 slots separated by 2 slots from the others. If DCI indicating the next multi-slot long PUCCH indicates the number of symbols transmitted in each slot to be Y=7 and transmission starting position in each slot to be 5, the UE may calculate the number of aggregated slots required as ceil(21/7)=3 and transmits a long PUCCH having a length of 7 symbols starting from the fifth symbol position in each of 3 slots separated from the others by using the slot spacing configured the same as the example above.

The [Proposed method #15] may be applied together with other proposed methods of the present disclosure to the extent that the method #15 does not collide with the other methods.

[Proposed method #16] A UE may be configured with the following parameters by a gNB semi-statically through an upper layer signal (for example, an RRC signal) or dynamically through DCI.

1. The number of symbols X required to satisfy target coverage, 2. the number of symbols Y of a long PUCCH transmitted in each slot (where Y is a natural number such that 4≤Y≤14), 3. starting position at which transmission of a long PUCCH is started within each slot, 4. spacing between slots (unit: slot).

Among the parameters, the number of symbols X required to satisfy target coverage may be configured semi-statically by using an upper layer signal such as an RRC signal; and spacing between slots constituting a multi-slot long PUCCH, starting position at which transmission of a long PUCCH is started within each slot, and the number of symbols Y of the long PUCCH transmitted in each slot may be indicated through individual fields within DCI or jointly coded to be dynamically indicated through a single field.

Among the parameters configured by the gNB, the UE may calculate the total number of aggregated slots required for transmission based on the number of symbols X required to satisfy target coverage and the number of symbols Y of a long PUCCH transmitted in each slot, which is indicated by DCI indicating a multi-slot long PUCCH, by using ceil(X/Y), for example.

The number of symbols X required to satisfy target coverage may use the same configured values until they are reconfigured by a gNB; and transmission starting position of a long PUCCH, spacing between slots, and the number of symbols of the long PUCCH within each slot may be indicated through DCI and transmitted differently for each multi-slot long PUCCH.

The slot spacing may be configured to be the same between slots, or a slot to which the long PUCCH is to be transmitted may be indicated through DCI or a bitmap format while a plurality of predetermined time patterns are configured in advance. Also, to obtain the frequency diversity gain, one of a plurality of frequency hopping patterns may be configured by an upper layer signal.

Also, DCI indicating a multi-slot long PUCCH may dynamically indicate the number of symbols of a long PUCCH in each slot constituting the multi-slot long PUCCH and starting position. And when the parameter 2, 3, and 4 are jointly coded to be indicated by one DCI field, a plurality of combinations of the parameter 2, 3, and 4 may be configured by an upper layer signal in advance, and one of the combinations may be indicated by DCI.

As one example, when X=21, and DCI indicating a multi-slot long PUCCH indicates the number of symbols transmitted in each slot to be Y=5, transmission starting position of a long PUCCH within each slot to be 4, and spacing between slots to be 2, the UE may calculate the number of aggregated slots required as ceil(21/5)=5. And if multi-slot long PUCCH transmission is instructed by DCI, a long PUCCH is transmitted through 5 symbols starting from the fourth symbol in each of 5 slots separated by 2 slots from the others.

If DCI indicating the next multi-slot long PUCCH indicates the number of symbols transmitted in each slot to be Y=7, transmission starting position in each slot to be 5, and spacing between slots to be 1-slot, the UE may calculate the number of aggregated slots required as ceil(21/7)=3 and transmits a long PUCCH having a length of 7 symbols starting from the fifth symbol position in each of 3 slots separated by 1-slot spacing from the others.

The [Proposed method #16] may be applied together with other proposed methods of the present disclosure to the extent that the method #16 does not collide with the other methods.

Figure 14:
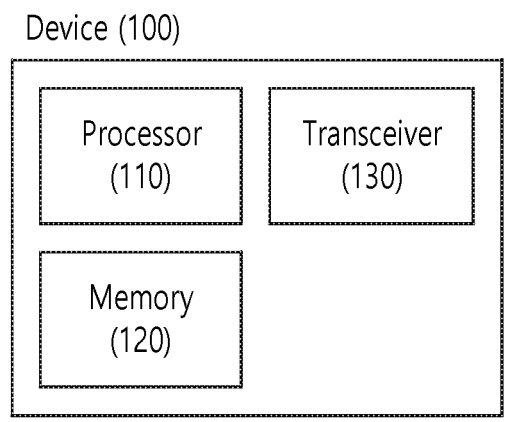
FIG. 14 illustrates a block diagram of a device in which an embodiment of the present disclosure is implemented.

FIG. 14 illustrates a block diagram of a device in which an embodiment of the present disclosure is implemented.

Referring to FIG. 14, the device 100 comprises a processor 110, a memory 120, and a transceiver 130. The processor 110 implements proposed functions, processes, and/or methods. The memory 120, being connected to the processor 110, stores various pieces of information for operating the processor 110. The transceiver 130, being connected to the processor 110, transmits and/or receives radio signals.

The device 100 may be a gNB or a UE.

Figure 15:
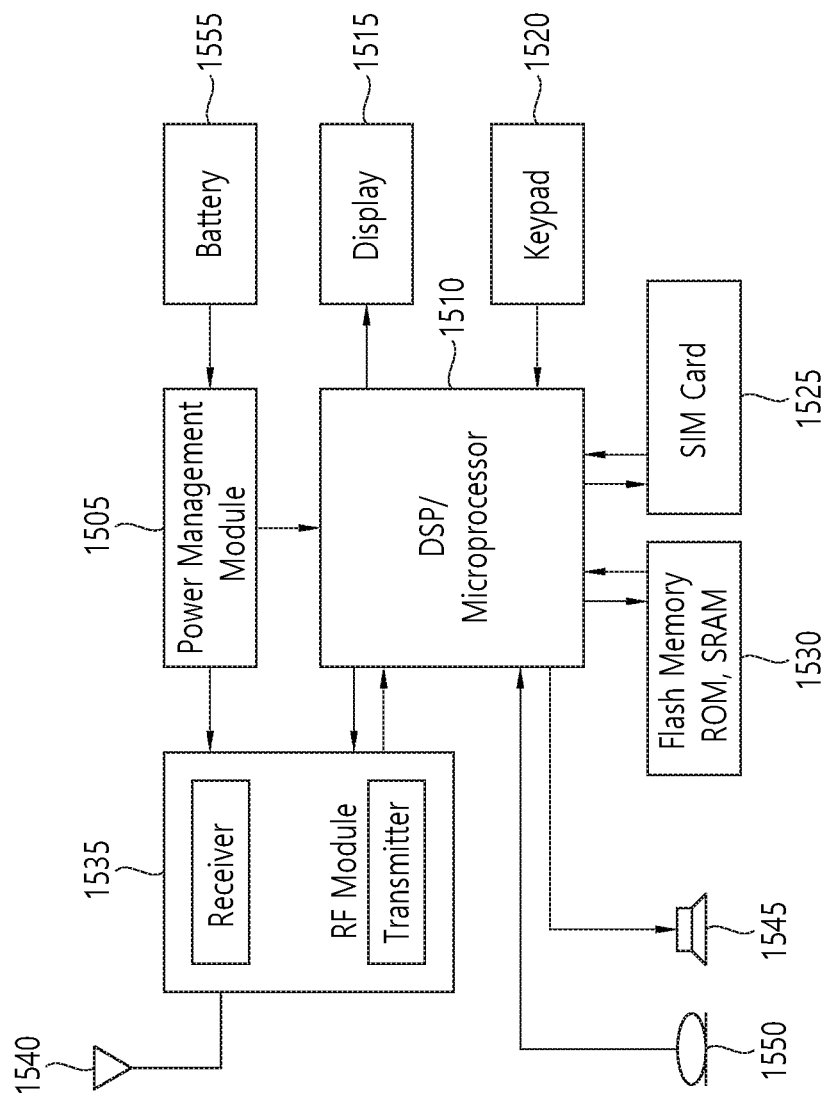
FIG. 15 illustrates a UE of FIG. 14 in more detail.

FIG. 15 illustrates a UE of FIG. 14 in more detail.

Referring to FIG. 15, the UE may comprise a processor (or a digital signal processor (DSP)) 1810, RF module (or RF unit) 1835, power management module 1805, antenna 1840, battery 1855, display 1815, keypad 1820, memory 1830, Subscriber Identification Module (SIM) card 1825 (which is optional), speaker 1845, and microphone 1850. Furthermore, the UE may include a single antenna or multiple antennas.

The processor 1810 implements the functions, processes and/or methods described with reference to FIGS. 9 to 13. Layers of a wireless interface protocol may be implemented by the processor. The memory 1830 is connected to the processor and stores information related to the operation of the processor. The memory 1830 may be installed inside or outside the processor and may be connected to the processor via various well-known means The user enters command information such as a phone number by pushing (or touching) buttons of the keypad 1820 or voice activation using the microphone 1850. The processor receives such command information and processes the command information to perform an appropriate function such as calling the phone number. Operational data may be extracted from the SIM card 1825 or memory 1830. Also, the processor may display command information or operating information on the display 1815 for the user's attention and convenience.

The RF module 1835, being connected to the processor, transmits and/or receives an RF signal.

The processor delivers command information to the RF module to initiate communication, for example, to transmit a radio signal comprising voice communication data. The RF module comprises a receiver and a transmitter to receive and transmit a radio signal. The antenna 1840 performs a function of transmitting and receiving a radio signal. When receiving a radio signal, the RF module may deliver the signal to be processed by the processor and convert the signal into the baseband. The processed signal may be converted to audible signal output through the speaker 1845 or readable information.

The processor 110 may include application-specific integrated circuits (ASICs), other chipsets, logic circuits, data processors and/or a converter mutually converting a baseband signal and a wireless signal. The memory 120 may include read-only memory (ROM), random access memory (RAM), a flash memory, memory cards, storage mediums and/or other storage devices. The transceiver 130 may include at least one antenna for transmitting and/or receiving a wireless signal. When an embodiment is implemented by software, the above-described scheme may be implemented using a module (process or function) which performs the above function. The module may be stored in the memory 120 and executed by the processor 110. The memory 120 may be disposed within or outside the processor 110 and connected to the processor using a variety of well-known means.

What is claimed is:

1. A method for transmitting uplink control information by a User Equipment (UE) in a wireless communication system, the method comprising:
   receiving a higher layer signal for a plurality of physical uplink control channel (PUCCH) resources;
   receiving downlink control information (DCI);
   generating the uplink control information; and
   transmitting the uplink control information, based on the higher layer signal and the DCI, to a base station using a specific PUCCH format among a plurality of PUCCH formats,
   wherein the uplink control information comprises hybrid automatic repeat and request-acknowledge (HARQ-ACK) information,
   wherein the specific PUCCH format is determined based on a number of symbols used for transmission of the uplink control information in a time domain and a number of bits of the uplink control information,
   wherein the plurality of PUCCH formats comprise:
      PUCCH format 0 in which the number of symbols used for transmission of the uplink control information in the time domain is 1 or 2 and the number of bits of the uplink control information is 1 or 2,
      PUCCH format 1 in which the number of symbols used for transmission of the uplink control information in the time domain is 4 or more and the number of bits of the uplink control information is 1 or 2,
      PUCCH format 2 in which the number of symbols used for transmission of the uplink control information in the time domain is 1 or 2, and the number of bits of the uplink control information is more than 2, PUCCH format 3 or PUCCH format 4 in which the number of symbols used for transmission of the uplink control information in a time domain is 4 or more and the number of bits of the uplink control information is more than 2, wherein the DCI comprises (i) a PUCCH resource indicator field informing of a PUCCH resource among the plurality of PUCCH resources and (ii) a slot timing indicator field informing of a slot where the specific PUCCH format is to be transmitted, and wherein the specific PUCCH format is transmitted based on the PUCCH resource informed by the PUCCH resource indicator field in the slot informed by the slot timing indicator field.

2. The method of claim 1, wherein each of the plurality of PUCCH resources comprises at least one of a parameter related to a first symbol to which a PUCCH is transmitted, a parameter related to a first physical resource block (PRB) to which a PUCCH is transmitted, a parameter related to the number of symbols to which a PUCCH is transmitted, a parameter related to an orthogonal cover code (OCC), or a parameter related to cyclic shift (CS).

3. The method of claim 1, further comprising receiving data from the base station.

4. The method of claim 3, wherein the HARQ-ACK information is acknowledge/negative-acknowledgement (ACK/NACK) for the data.

5. The method of claim 1, wherein the specific PUCCH format is transmitted within a slot comprising 14 symbols in the time domain.

6. The method of claim 1, wherein the PUCCH format 3 does not support multiplexing with PUCCH formats transmitted by other UEs.

7. The method of claim 1, wherein the PUCCH format 4 supports multiplexing with PUCCH formats transmitted by other UEs.

8. A user equipment (UE) configured to operate in a wireless communication system, the UE comprising:
a transceiver configured to transmit and receive radio signals; and
a processor configured to operate in conjunction with the transceiver, wherein the processor is further configured to:
receive a higher layer signal for a plurality of physical uplink control channel (PUCCH) resources;
receive downlink control information (DCI);
generate uplink control information, and
transmit the uplink control information, based on the higher layer signal and the DCI, to a base station using a specific PUCCH format among a plurality of PUCCH formats, wherein the uplink control information comprises hybrid automatic repeat and request-acknowledge (HARQ-ACK) information, wherein the specific PUCCH format is determined based on a number of symbols used for transmission of the uplink control information in a time domain and a number of bits of the uplink control information, wherein the plurality of PUCCH formats comprise:
PUCCH format 0 in which the number of symbols used for transmission of the uplink control information in the time domain is 1 or 2 and the number of bits of the uplink control information is 1 or 2, PUCCH format 1 in which the number of symbols used for transmission of the uplink control information in the time domain is 4 or more and the number of bits of the uplink control information is 1 or 2, PUCCH format 2 in which the number of symbols used for transmission of the uplink control information in the time domain is 1 or 2, and the number of bits of the uplink control information is more than 2, PUCCH format 3 or PUCCH format 4 in which the number of symbols used for transmission of the uplink control information in a time domain is 4 or more and the number of bits of the uplink control information is more than 2, wherein the DCI comprises (i) a PUCCH resource indicator field informing of a PUCCH resource among the plurality of PUCCH resources and (ii) a slot timing indicator field informing of a slot where the specific PUCCH format is to be transmitted, and wherein the specific PUCCH format is transmitted based on the PUCCH resource informed by the PUCCH resource indicator field in the slot informed by the slot timing indicator field.

* * * * *